(12) United States Patent
Hashimoto

(10) Patent No.: US 8,302,271 B2
(45) Date of Patent: Nov. 6, 2012

(54) PRODUCTION DEVICE FOR CONNECTING ROD

(75) Inventor: Yoshinari Hashimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 12/448,108

(22) PCT Filed: Nov. 20, 2007

(86) PCT No.: PCT/JP2007/072469
§ 371 (c)(1),
(2), (4) Date: Jun. 9, 2009

(87) PCT Pub. No.: WO2008/072450
PCT Pub. Date: Jun. 19, 2008

(65) Prior Publication Data
US 2010/0018023 A1 Jan. 28, 2010

(30) Foreign Application Priority Data
Dec. 13, 2006 (JP) .................................. 2006-335444

(51) Int. Cl.
*B23P 19/04* (2006.01)
*B26F 3/00* (2006.01)
*B65H 35/00* (2006.01)
(52) U.S. Cl. ............................ 29/239; 225/104; 225/105
(58) Field of Classification Search .................... 29/239; 225/104, 105
See application file for complete search history.

(56) References Cited

U.S. PATENT DOCUMENTS

| 4,860,419 A * | 8/1989 | Hekman ..................... 29/888.09 |
| 5,115,564 A * | 5/1992 | Miessen et al. ............ 29/888.09 |
| 5,169,046 A * | 12/1992 | Miessen et al. ............... 225/100 |
| 5,320,265 A * | 6/1994 | Becker ........................... 225/104 |
| 5,568,891 A * | 10/1996 | Hoag et al. ....................... 225/93 |
| 6,386,417 B1 * | 5/2002 | Jones et al. ................... 225/103 |
| 6,457,621 B1 * | 10/2002 | Hahnel et al. ................. 225/103 |

(Continued)

FOREIGN PATENT DOCUMENTS

EP 1 036 622 A1 9/2000
(Continued)

OTHER PUBLICATIONS

German Office Action patent application No. 112007003018.6-14 dated Dec. 23, 2009.

(Continued)

*Primary Examiner* — Lee D Wilson
*Assistant Examiner* — Alvin Grant
(74) *Attorney, Agent, or Firm* — Squire Sanders (US) LLP

(57) ABSTRACT

A set of bolt holes through which bolts are inserted are formed in left and right sides of a large end section. The bolt holes are substantially parallel to the axis of a rod section and are located such that the centers of the bolt holes are each displaced from the center of a cut surface. When a first mandrel and a second mandrel are press fitted to a joint hole of the large end section and are cut and split, the area of contact of the second mandrel on the movable stage side with the inner wall of the joint hole is set greater than the area of contact of the first mandrel on the fixed stage side with the inner wall of the joint hole.

2 Claims, 23 Drawing Sheets

U.S. PATENT DOCUMENTS

| | | | |
|---|---|---|---|
| 6,474,526 B1 * | 11/2002 | Hahnel et al. | 225/100 |
| 6,571,999 B2 | 6/2003 | Hase | |
| 7,155,791 B1 * | 1/2007 | Foster | 29/239 |
| 2004/0129751 A1 * | 7/2004 | Piana et al. | 225/101 |
| 2005/0011925 A1 * | 1/2005 | Momose et al. | 225/1 |
| 2005/0172484 A1 | 8/2005 | Hase | |
| 2008/0011801 A1 | 1/2008 | Okumura et al. | |

FOREIGN PATENT DOCUMENTS

| | | |
|---|---|---|
| EP | 1 398 103 B1 | 11/2006 |
| JP | 06-042527 | 2/1994 |
| JP | 10-277848 | 10/1998 |
| JP | 2002-66998 | 3/2002 |
| JP | 2005-096066 | 4/2005 |
| JP | 2005-219165 | 8/2005 |
| JP | 2006-142467 | 6/2006 |

OTHER PUBLICATIONS

Japanese Office Action 2006-335444 dated Jun. 16, 2009.

* cited by examiner

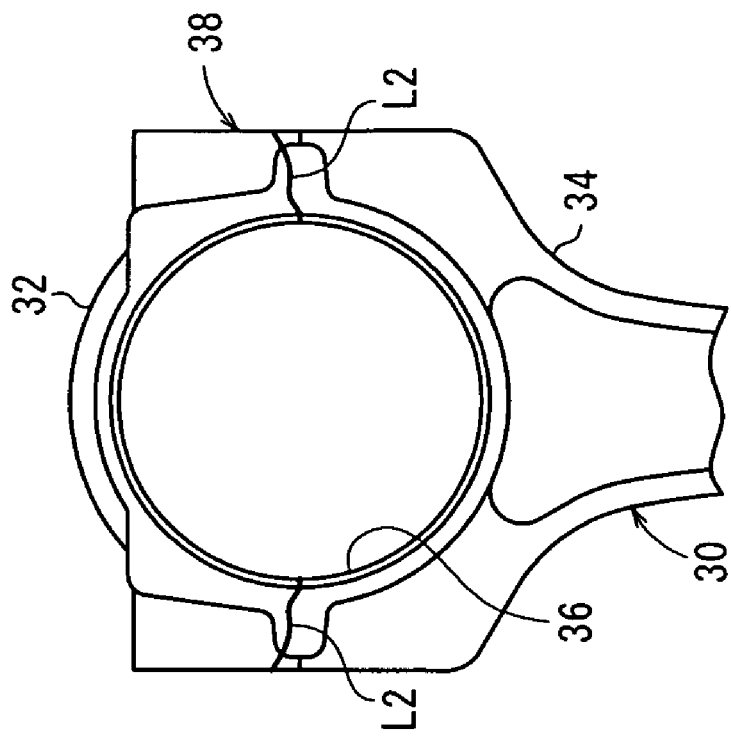
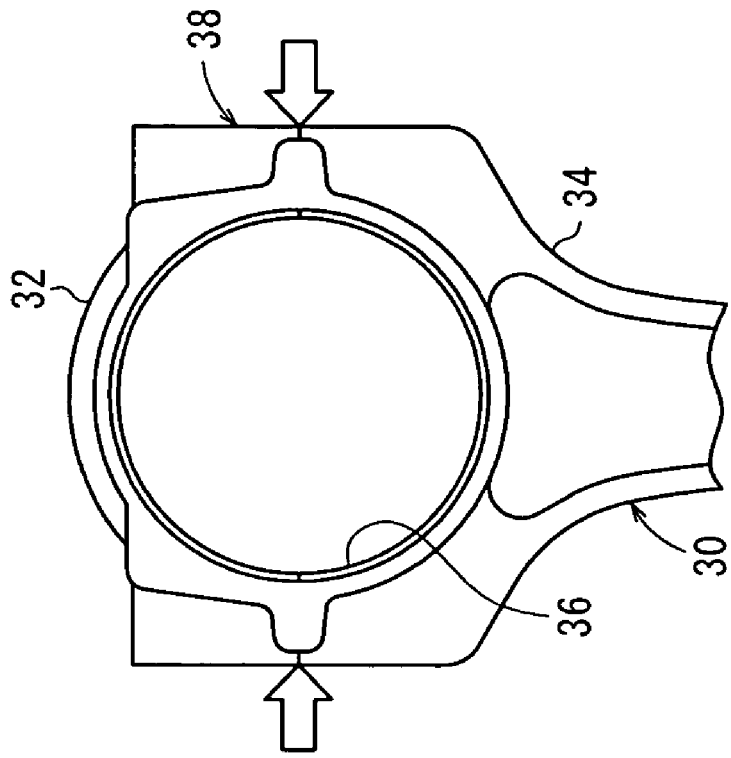

PRODUCTION DEVICE FOR CONNECTING ROD

TECHNICAL FIELD

The present invention relates to an apparatus (device) for manufacturing a connecting rod as an engine component for vehicles, and more particularly to an apparatus for manufacturing a connecting rod by integrally forming a connecting rod having a larger end and a smaller end, and cracking the larger end into a cap part and a rod part.

BACKGROUND ART

Connecting rods which connect piston pins and crankpins are widely employed in engines for vehicles. A connecting rod has a larger end connected to the crankpin and a smaller end connected to the piston pin. For manufacturing the connecting rod, it is customary to integrally form a connecting rod from the larger end to the smaller end by forging or the like, for example, and then cracking the larger end into a cap part and a rod part.

An apparatus for cracking a connecting rod disclosed in Japanese Laid-Open Patent Publication No. 10-277848, for example, comprises an internal pressure applying device for applying an outward internal pressure to a bearing hole in the bearing of a connecting rod and a pair of external pressure applying devices for applying an external pressure to the bearing. The external pressure applying devices apply an external pressure to the bearing and the internal pressure applying device applies an internal pressure to the bearing. While the internal pressure applied by the internal pressure applying device is of a level capable of cracking the bearing, the bearing is instantaneously released from the external pressure applied by the external pressure applying devices, thereby enabling the internal pressure to instantaneously crack the bearing.

Japanese Laid-Open Patent Publication No. 2002-066998 discloses an apparatus for fracturing a connecting rod, comprising first and second support members for horizontally supporting a connecting rod, the first and second support members being disposed on a base of a pallet for placing the connecting rod thereon and movable in directions away from each other, a split mandrel having mandrel halves vertically mounted on the first and second support members and having respective outer circumferential surfaces for abutment against respective inner surfaces of an opening part, a wedge having tapered surfaces abutting against confronting end surfaces of the mandrel halves, for uniformly separating and spreading the mandrel halves away from each other, an actuator for applying a load to the wedge, and a control circuit for applying an initial load to the actuator to bring the mandrel halves into abutment against the respective inner surfaces of the opening part and thereafter applying a fracture load to instantaneously fracture the opening part.

Japanese Laid-Open Patent Publication No. 06-042527, for example, reveals an apparatus for cracking a connecting rod by equally applying breaking forces in directions to separate a pair of semicylindrical protrusions away from each other, to axially opposite sides of the semicylindrical protrusions which are fitted in a hole defined in a larger end of a connecting rod, thereby preventing the hole in the cracked larger end from being distorted.

In the cracking apparatus disclosed in Japanese Laid-Open Patent Publication No. 10-277848, Japanese Laid-Open Patent Publication No. 2002-066998, and Japanese Laid-Open Patent Publication No. 06-042527, the mandrel which comprises the mandrel halves in the form of identically shaped semicylindrical protrusions is inserted in the hole in the larger end of the connecting rod to position the connecting rod, and thereafter the wedge is pushed into holes of rectangular cross section defined in the mandrel halves to spread the mandrel halves away from each other, thereby cracking the larger end into the cap part and the rod part.

Stated otherwise, in the cracking apparatus disclosed in Japanese Laid-Open Patent Publication No. 10-277848, Japanese Laid-Open Patent Publication No. 2002-066998, and Japanese Laid-Open Patent Publication No. 06-042527, the mandrel halves that have identical areas of contact are placed in the hole in the larger end of the connecting rod, and the wedge is pushed in between the mandrel halves to spread the mandrel halves away from each other, thereby cracking the larger end contacted by the mandrel halves into the cap part and the rod part.

Some connecting rods for use in different engine types have a pair of bolt holes defined in respective side walls of the large end substantially parallel to the axis of the rod part for receiving therein respective bolts for integrally coupling the cap part and the rod part to each other, the bolt holes having respective central axes displaced off the centers of the fractured surfaces radially inwardly toward a joint hole in the larger end of the connecting rod, i.e., displaced closely to the joint hole in the larger end of the connecting rod.

When the larger end of a connecting rod for use in such a different engine type is cracked into a cap part and a rod part by moving apart the mandrel halves from each other, which have identical areas of contact with the inner circumferential surfaces of the joint hole in the larger end of the connecting rod, of the cracking apparatus disclosed in Japanese Laid-Open Patent Publication No. 10-277848, Japanese Laid-Open Patent Publication No. 2002-066998, and Japanese Laid-Open Patent Publication No. 06-042527, as shown in FIG. 23 of the accompanying drawings, crack lines 1 travel horizontally from the inner circumferential surface of a joint hole 3 in a larger end 2 to respective bolt holes 4, and then travel across and from the bolt holes 4 upwardly toward a cap part 5 away from a rod part 6. The crack lines 1 thus extend obliquely upwardly in directions away from the joint hole 3. As a consequence, irregular fractured surfaces are developed between the cap part 5 and the rod part 6, resulting in a defective product.

DISCLOSURE OF THE INVENTION

It is a major object of the present invention to provide an apparatus for manufacturing a connecting rod by appropriately cracking a larger end thereof even if fastening holes defined in the larger end are displaced off the centers of fractured surfaces of the larger end.

According to the present invention, there is provided an apparatus for manufacturing a connecting rod by integrally forming a connecting rod having a larger end and a smaller end, setting a joint hole in the larger end over a pair of spreaders, and spreading the spreaders apart from each other to crack the larger end into a cap part and a rod part. The apparatus includes a fixed stage fixedly mounted on a base, a movable stage disposed in facing relation to the fixed stage and horizontally movable toward and away from the fixed stage, a spreader mounted on the fixed stage, another spreader mounted on the movable stage for displacement in unison with the movable stage, and a loading mechanism for applying a fracture load to move the spreaders away from each other to crack the larger end, wherein the larger end has a pair of fastening holes defined therein on respective horizontal sides of the larger end substantially parallel to the axis of the rod part, for inserting therein respective fasteners to fasten the cap part and the rod part to each other, the fastening holes having respective central axes displaced off the centers of fractured surfaces of the larger end, and when the spreaders engage in the joint hole to crack the larger end, the area of contact between the other spreader on the movable stage and an inner wall surface of the joint hole is greater than the area of contact between the spreader on the fixed stage and an inner wall surface of the joint hole.

The above apparatus operates as follows: The rod part of the connecting rod is set on the fixed stage, and the cap part of the connecting rod is set on the movable stage that is movable with respect to the fixed stage.

Then, the loading mechanism applies a fracture load to move the movable stage away from the fixed stage. The spreader on the fixed stage and the other spreader on the movable stage are displaced away from each other, thereby cracking the larger end into the cap part and the rod part.

The areas of contact between the spreaders and the inner wall surface of the joint hole in the larger end are made different from each other. Even though the central axes of the fastening holes defined in the larger end on both sides thereof are disposed out of alignment with the centers of fractured surface, but displaced off the centers of fractured surface radially inwardly toward the joint hole by a certain distance because of the engine type incorporating the connecting rod, for example, a strain developed in the larger end when the larger end is cracked can appropriately be controlled to orient crack lines between the cap part and the rod part substantially horizontally.

Therefore, even though the fastening holes for inserting the fasteners therein are displaced off the centers of the fractured surfaces, the larger end of the connecting rod can appropriately be cracked into the cap part and the rod part without being adversely affected by the joint hole.

The spreader on the fixed stage may be disposed closely to the rod part, and the other spreader on the movable stage may be disposed closely to the cap part. Stated otherwise, the area of contact of the spreader on the movable stage with the inner wall surface of the joint hole may be greater than the area of contact of the spreader on the fixed stage with the inner wall surface of the joint hole.

BRIEF DESCRIPTION OF THE DRAWINGS

FIG. 22A is a fragmentary plan view showing the manner in which a horizontal inward strain is applied to a connecting rod;

FIG. 22B is a fragmentary plan view showing the manner in which crack lines travel obliquely upwardly in the connecting rod shown in FIG. 22A.

BEST MODE FOR CARRYING OUT THE INVENTION

Apparatus for manufacturing a connecting rod according to preferred embodiments of the present invention will be described in detail below with reference to the accompanying drawings.

Figure 1A:
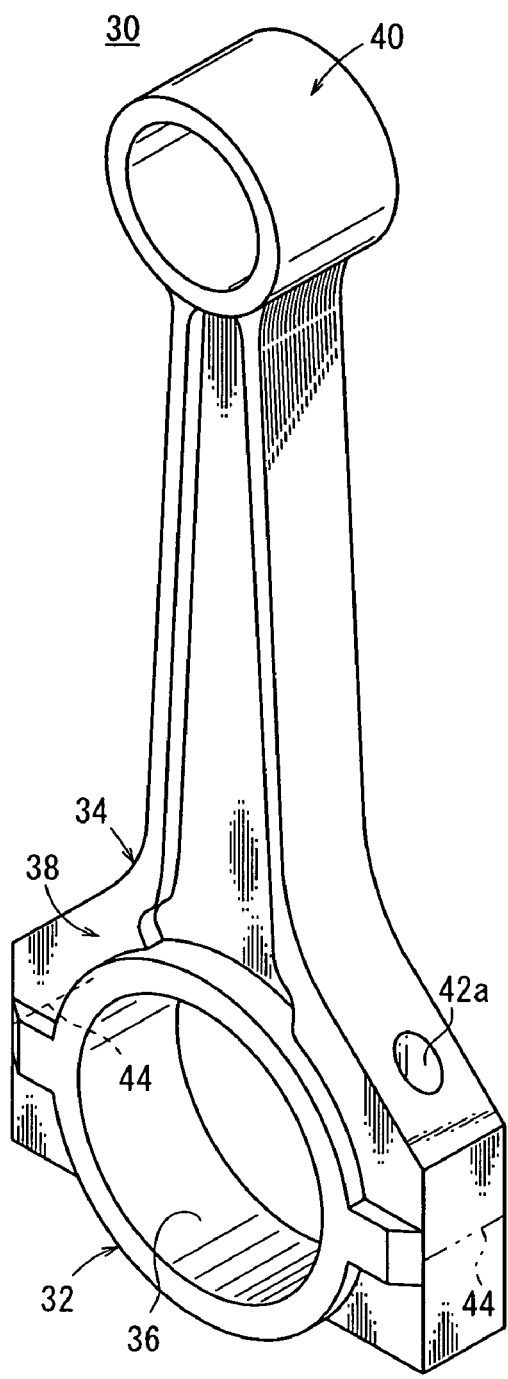
FIG. 1A is a perspective view of a connecting rod to which the present invention is applicable.
Figure 1B:
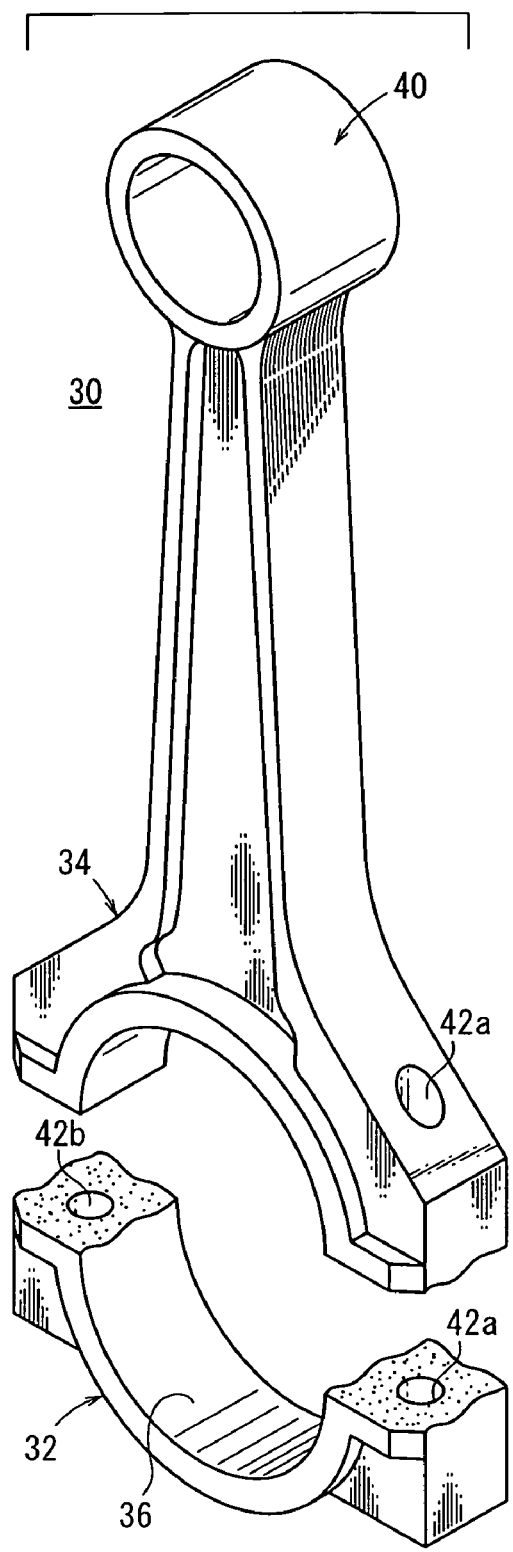
FIG. 1B is a perspective view of the connecting rod shown in FIG. 1A, which has been cracked into a cap part and a rod part.

FIG. 1A is a perspective view of a connecting rod 30 as a workpiece to which the present invention is applicable, and FIG. 1B is a perspective view of the connecting rod 30, which has been cracked into a cap part 32 and a rod part 34.

The connecting rod 30 has a larger end 38 including a cap part 32 an a rod part 34 which are integrally united across a substantially circular joint hole 36, and a smaller end 40 positioned at an end of the rod part 34 remotely from the larger end 38. The connecting rod 30 is integrally formed by casting or forging, for example.

The larger end 38 has bolt holes (fastening holes) 42a, 42b defined therein on respective both sides thereof, the bolt holes 42a, 42b being formed substantially parallel to the axis of the rod part 34 by an unillustrated boring mechanism such as a drill or the like.

Figure 18A:
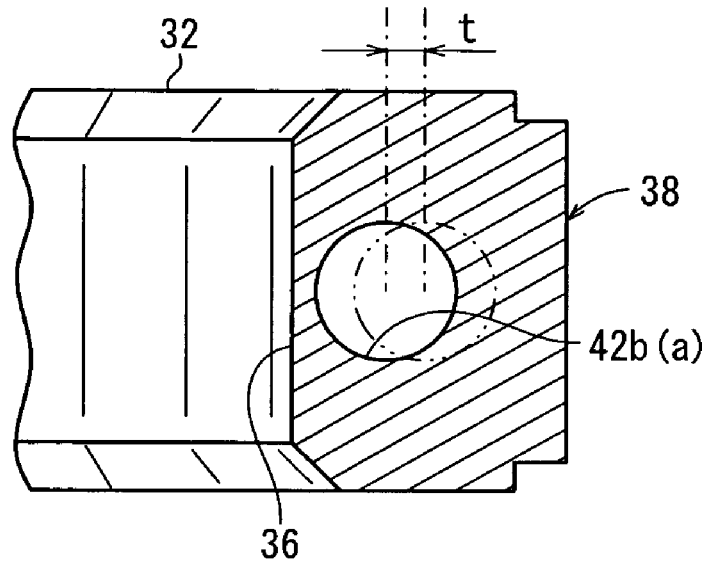
FIG. 18A is a sectional side elevational view showing a connecting rod to be cracked by the cracking apparatus shown in FIG. 2, the connecting rod having a bolt hole whose central axis is displaced off the center of a fractured surface toward a joint hole.

As shown in FIG. 18A, the bolt hole 42a (42b) has a central axis held out of alignment with the center of a fractured surface, to be described later, but displaced off the center of the fractured surface radially inwardly toward the joint hole 36 by a predetermined distance t, because of the engine type incorporating the connecting rod 30. Alternatively, the bolt hole 42a (42b) may have a central axis displaced off the center of the fractured surface radially outwardly toward an outer surface of the larger end 38 by a predetermined distance.

Figure 18B:
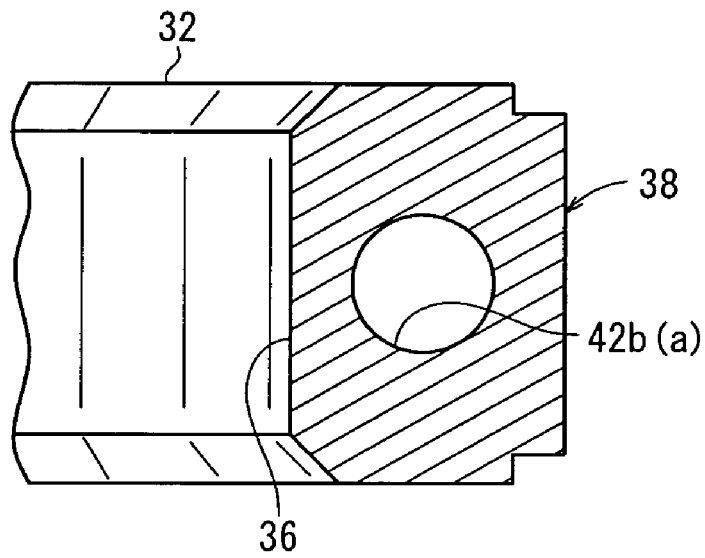
FIG. 18B is a sectional side elevational view showing a connecting rod according to a comparative example, the connecting rod having a bolt hole whose central axis is aligned with the center of a fractured surface.

As can be understood from a comparison with a comparative example shown in FIG. 18B in which the center of the bolt hole 42a (42b) is held in alignment with the center of the fractured surface, a region to the left of the bolt hole 42a (42b) and a region to the right of the bolt hole 42a (42b) have different fractured areas. Specifically, as shown in FIG. 18A, the left region between the bolt hole 42a (42b) and an inner wall surface of the joint hole 36 has a smaller fractured area, and the right region between the bolt hole 42a (42b) and an outer surface of the larger end 38 has a greater fractured area.

In a process of assembling an engine or the like, for example, bolts (fasteners), not shown, are threaded respectively into the bolt holes 42a, 42b from the cap part 32 side, thereby fastening the cap part 32 to the rod part 34. When the cap part 32 and the rod part 34 are thus joined to each other, the larger end 38 of the connecting rod 30 is connected to a crankpin of the engine.

In FIG. 1A, the reference numeral 44 denotes cracking regions. The cracking regions 44 where the larger end 38 will be cracked into the cap part 32 and the rod part 34, are positioned at a boundary between the cap part 32 and the rod part 34. The cracking regions 44 are disposed on both sides of the larger end 38 centrally across the joint hole 36.

Figure 2:
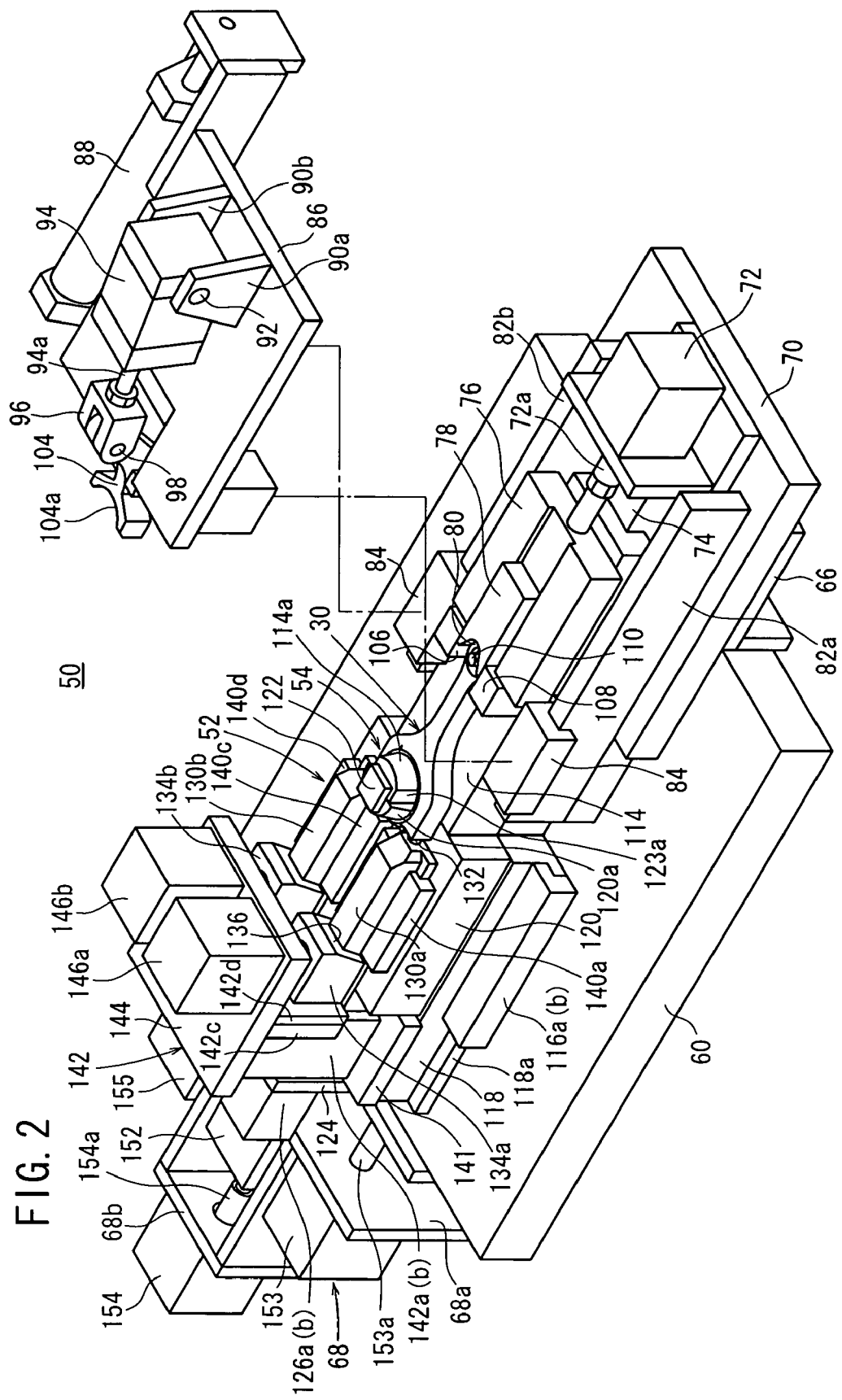
FIG. 2 is an exploded perspective view of a cracking apparatus according to an embodiment of the present invention.
Figure 3:
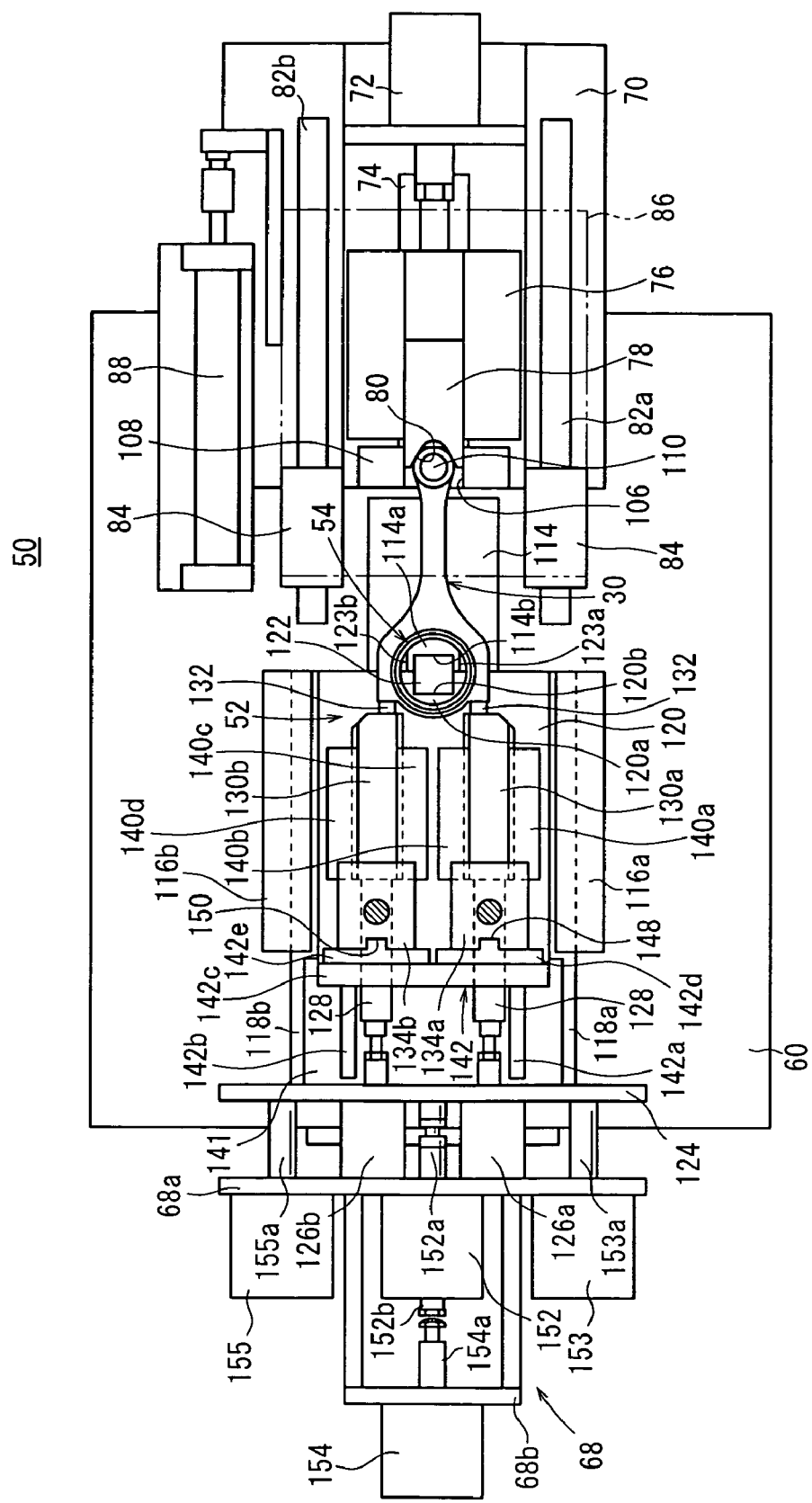
FIG. 3 is a plan view, partly in cross section, of the cracking apparatus shown in FIG. 2.
Figure 4:
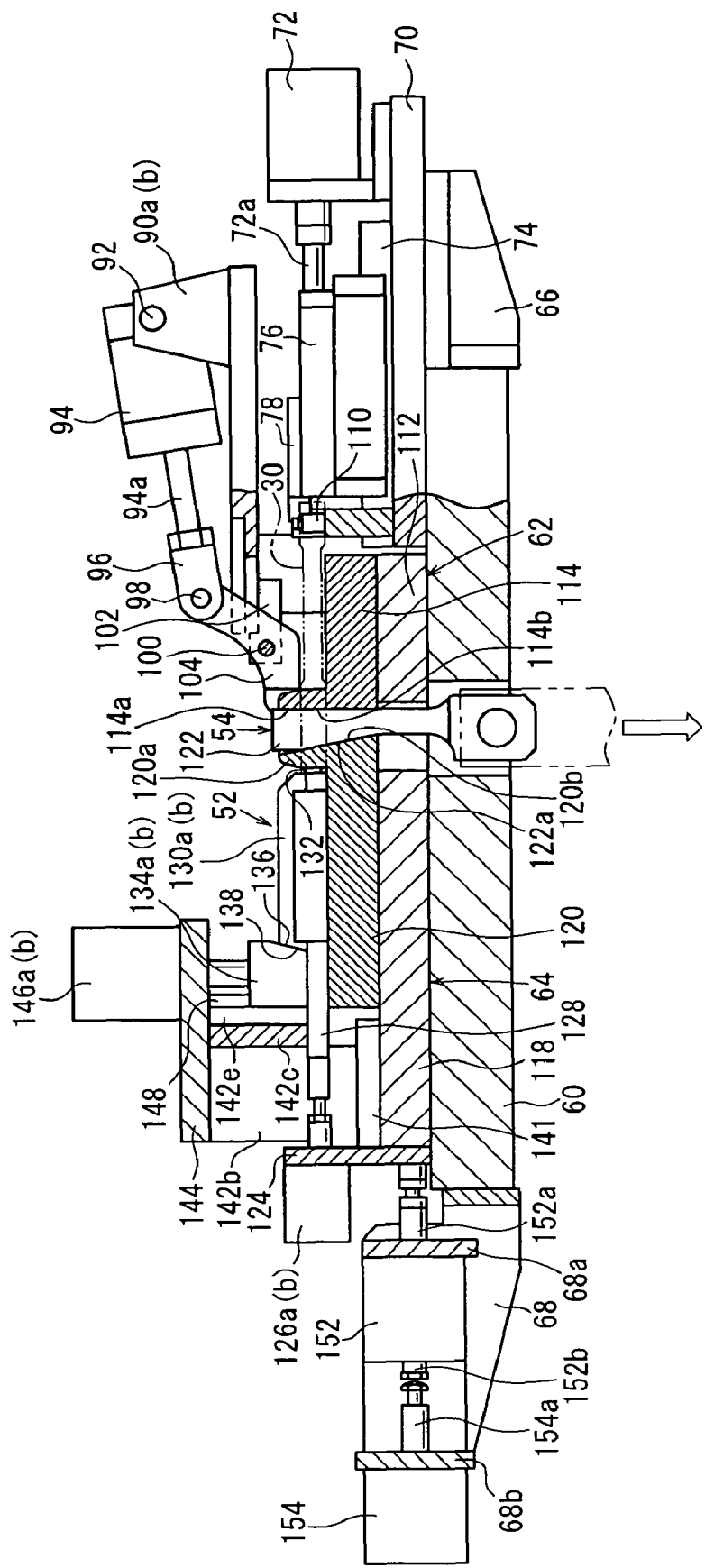
FIG. 4 is a vertical cross-sectional view of the cracking apparatus shown in FIG. 3 taken along an axial direction thereof.

A cracking apparatus 50 according to an embodiment of the present invention is shown in FIGS. 2 through 4. FIG. 2 is an exploded perspective view of the cracking apparatus 50. FIG. 3 is a plan view of the cracking apparatus 50 shown in FIG. 2. FIG. 4 is a vertical cross-sectional view of the cracking apparatus 50 taken along an axial direction in FIG. 2.

The cracking apparatus 50 comprises a workpiece positioning and holding mechanism 52 for setting the connecting rod 30 positioned at a predetermined position and holding the connecting rod 30 thus set, a cracking mechanism 54 for cracking the larger end 38 of the connecting rod 30, a preload applying mechanism 56 (see FIGS. 7 and 8) for applying a preload to the cracking mechanism 54, and a loading mechanism 58 (see FIGS. 7 and 8) for applying an impact load to the cracking mechanism 54 by dropping weights 57.

The workpiece positioning and holding mechanism 52 comprises a base 60 which is of a substantially elongate rectangular shape as viewed in plan, a fixed stage 62 fixedly mounted on the base 60, a movable stage 64 disposed in confronting relation to the fixed stage 62 and movable toward and away from the fixed stage 62 horizontally in the axial directions of the base 60, and first and second brackets 66, 68 secured respectively to the opposite ends of the base 60 and projecting outwardly in the axial directions of the base 60.

The fixed stage 62 includes a fixed table 70 fixed to the base 60 by the first bracket 66, a first oil cylinder 72 secured to the fixed table 70, a movable block 76 coupled to the distal end of a piston rod 72a of the first oil cylinder 72 and movable along a guide rail 74 back and forth in the axial directions of the connecting rod 30, and a first workpiece support member 78 secured in a groove defined in the movable block 76 and projecting a predetermined distance from an end of the movable block 76, the first workpiece support member 78 being movable by the first oil cylinder 72 to engage the smaller end 40 of the connecting rod 30 and push the smaller end 40 toward the larger end 38 in the axial direction of the connecting rod 30.

The pressure of pressure oil supplied to the first oil cylinder 72 can be changed between high and low levels by a switching valve (not shown) to change forces (thrust forces) with which to push the smaller end 40 toward the larger end 38 in the axial direction of the connecting rod 30.

Figure 5:
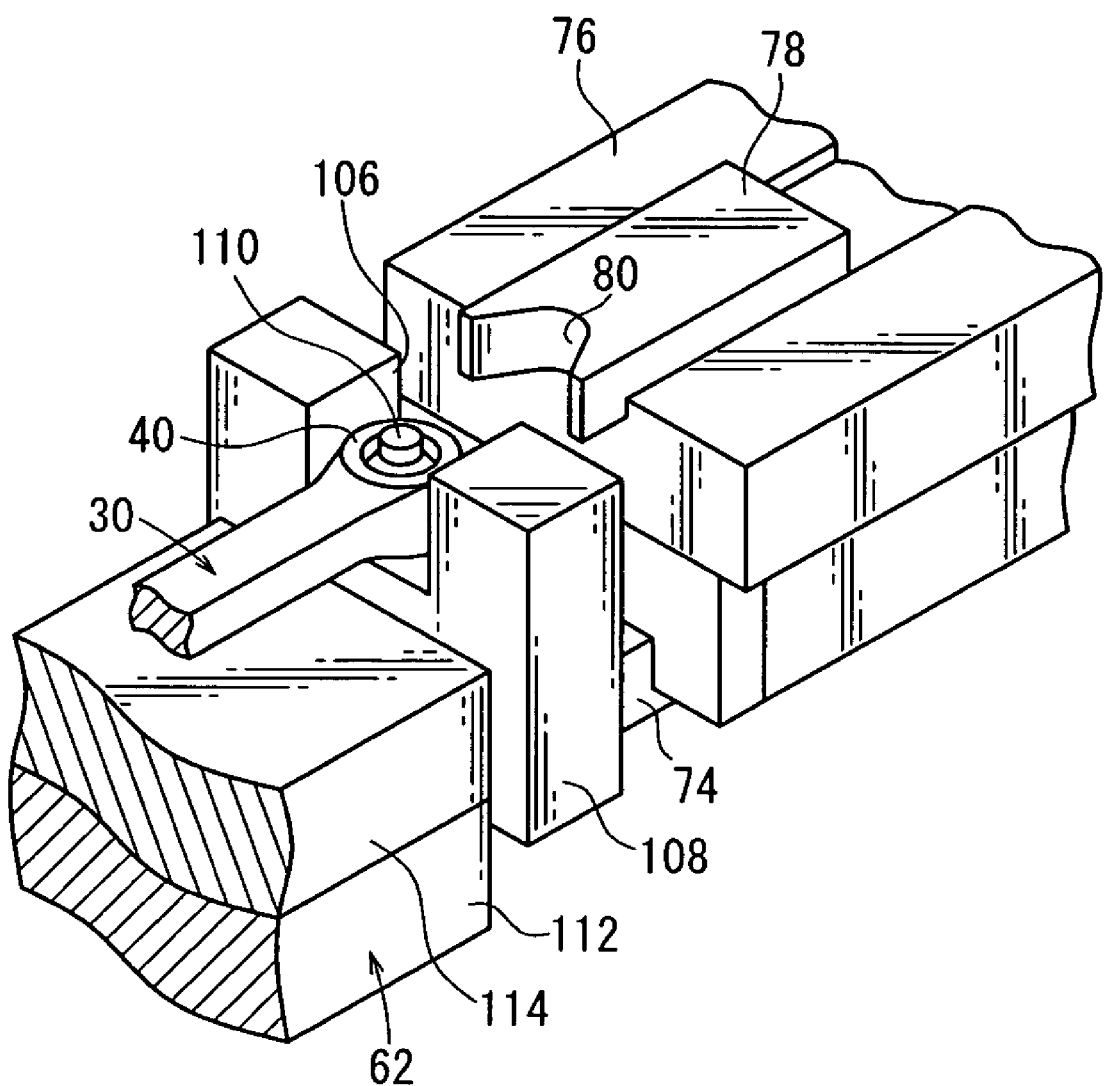
FIG. 5 is an enlarged fragmentary perspective view, partly in cross section, of the cracking apparatus shown in FIG. 2.

As shown in FIGS. 2 and 5, the first workpiece support member 78 has a tapered engaging slot 80 of V-shaped cross section defined in the distal end thereof for engaging the smaller end 40 of the connecting rod 30.

The fixed stage 62 also has a pair of guide members 82a, 82b fixedly mounted on the fixed table 70 substantially parallel to each other with the movable block 76 disposed therebetween, a slider 86 movable toward and away from the connecting rod 30 on a pair of guide blocks 84 slidable along the respective guide members 82a, 82b, and a first air cylinder 88 fixedly mounted on the fixed table 70 for moving the slider 86 toward and away from the connecting rod 30.

On the slider 86, there are mounted a second air cylinder 94 angularly movable through a predetermined angle about a first pin 92 pivotally attached to a pair of bearing blocks 90a, 90b on the slider 86, a joint member 96 having a bifurcated end and coupled to a piston rod 94a of the second air cylinder 94, and a second workpiece support member 104 having an end pivotally attached to the bifurcated end of the joint member 96 by a second pin 98 and a central portion pivotally supported on a joint plate 102 of the slider 86 by a third pin 100.

The second workpiece support member 104 has a substantially Y-shaped presser 104a on its distal end. When the second air cylinder 94 is actuated, the presser 104a is angularly moved (turned) a predetermined angle about the third pin 100 to press downwardly an upper surface of the larger end 38 (the rod part 34) of the connecting rod 30 for thereby holding the connecting rod 30.

As shown in FIG. 5, a bifurcated fixed block 108 projecting upwardly with a recess 106 of substantially rectangular cross section defined centrally in its upper surface is fixedly mounted on the base 60 near the fixed table 70. A positioning and fixing pin 110 is disposed in the recess 106 for extending through the hole in the smaller end 40 and positioning and holding the smaller end 40.

When the first workpiece support member 78 is brought horizontally into the recess 106 in the fixed block 108, the engaging slot 80 in the distal end of the first workpiece support member 78 is guided to reliably engage the smaller end 40 while the first workpiece support member 78 and the connecting rod 30 are being held in axial alignment with each other.

Figure 6:
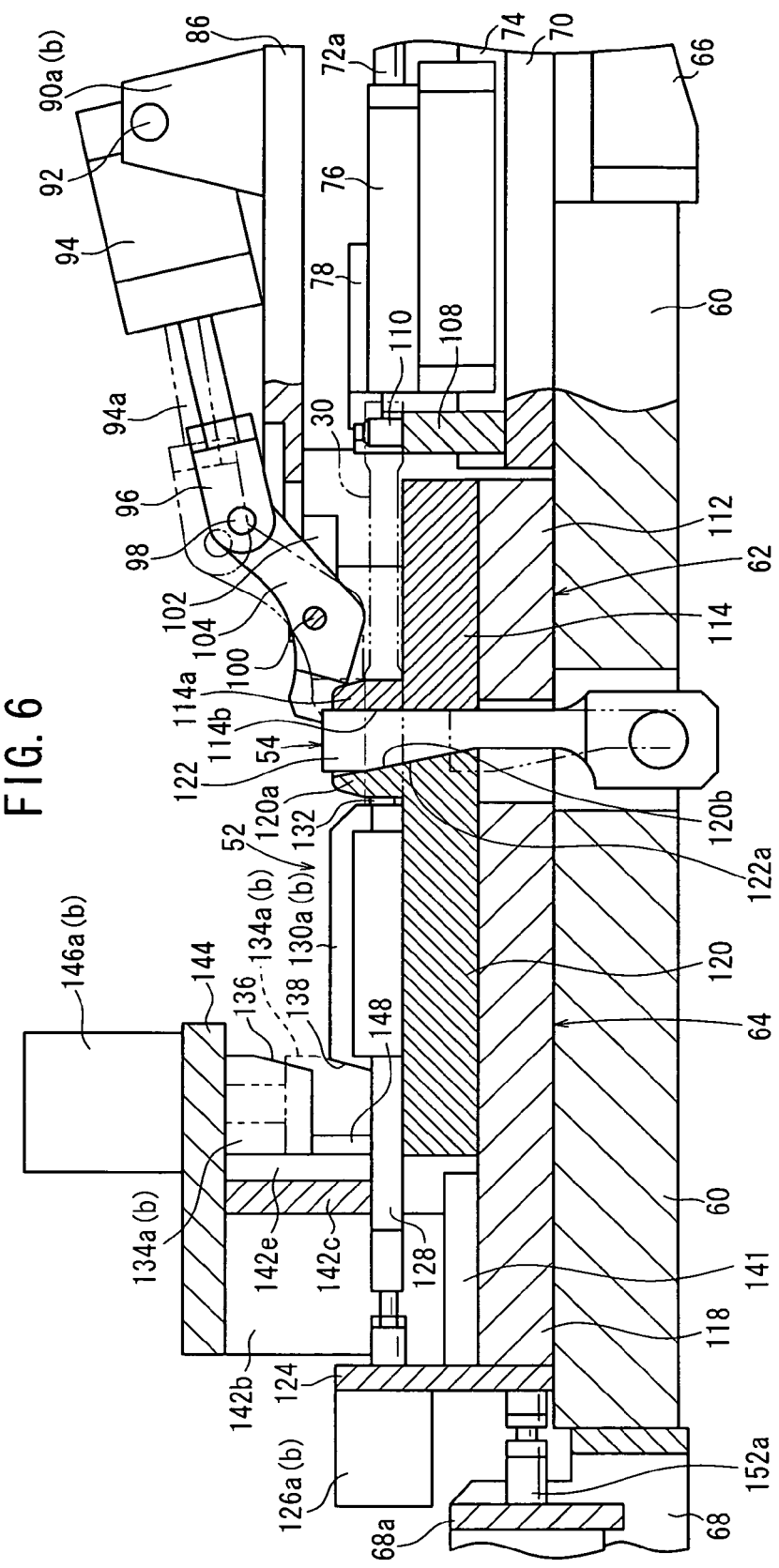
FIG. 6 is an enlarged fragmentary vertical cross-sectional view of the cracking apparatus shown in FIG. 4.

As shown in FIGS. 4 and 6, a holder block 112 fixedly mounted on the base 60 is disposed between the fixed block 108 and the movable stage 64. A first mandrel 114 having a semicircular protrusion 114a for contacting an inner wall surface of the joint hole 36 in the larger end 38 is fixedly mounted on the holder block 112. The first mandrel 114 functions as a fixed spreader.

As shown in FIGS. 2 and 3, a pair of first guide elements 116a, 116b are disposed substantially parallel to each other on the base 60 for guiding the movable stage 64 in the axial directions of the connecting rod 30. The first guide elements 116a, 116b have respective axially extending grooves defined therein over the upper surface of the base 60. A slide block 118 has a flange 118a which are slidably disposed in the respective grooves of the first guide elements 116a, 116b.

As shown in FIGS. 4 and 6, a second mandrel 120 having a semicircular protrusion 120a, for contacting an inner wall surface of the joint hole 36 in the larger end 38 is fixedly mounted on an upper surface of the slide block 118. The second mandrel 120 functions as a movable spreader. When the second mandrel 120 is displaced in unison with the movable stage 64, the second mandrel 120 moves a predetermined distance toward or away from the first mandrel 114 on the fixed stage 62.

Figure 17:
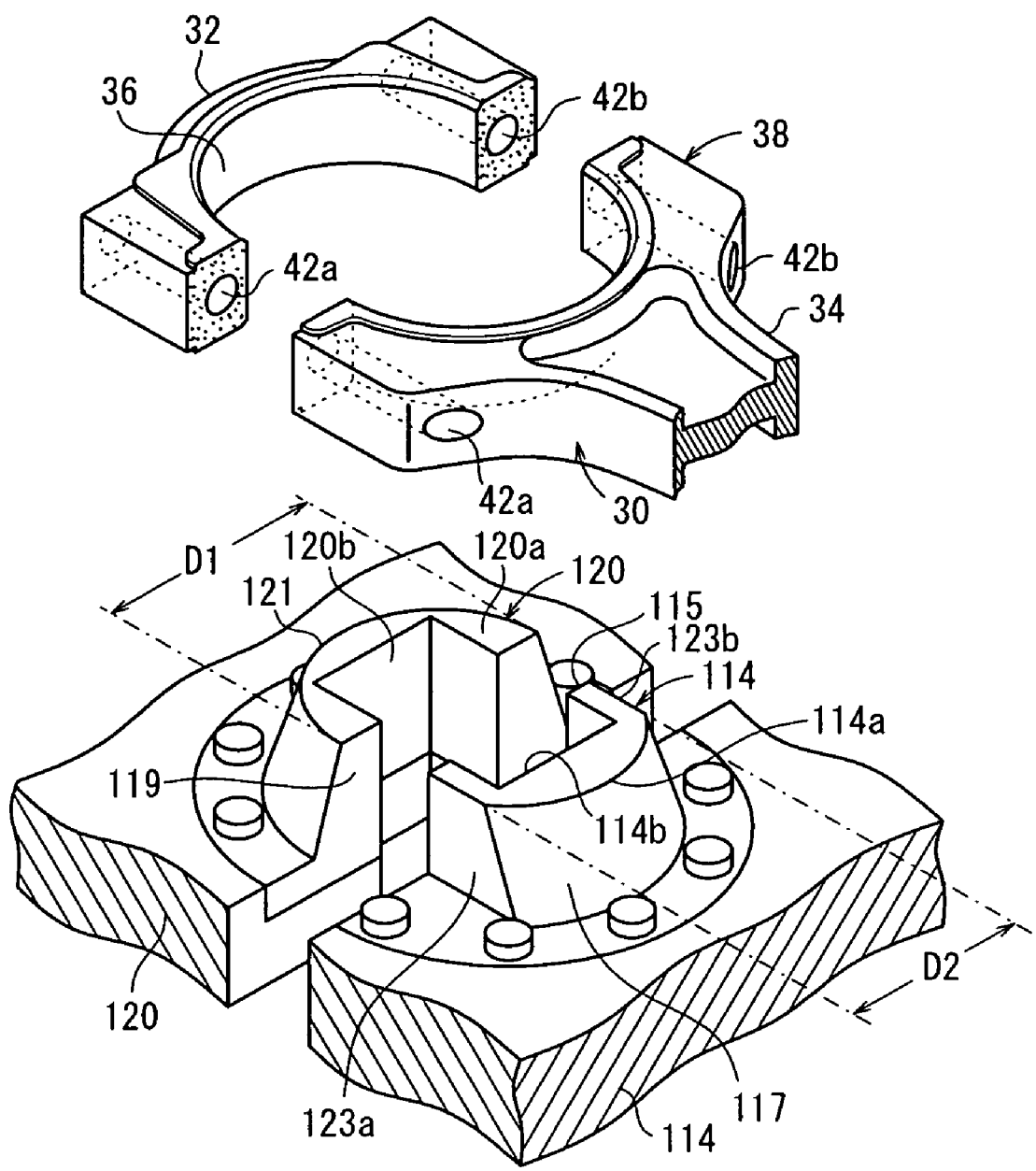
FIG. 17 is a fragmentary exploded perspective view showing a first mandrel and a second mandrel which have different areas of contact with an inner wall surface of a joint hole defined in the larger end of a connecting rod.

As shown in FIG. 17, the second mandrel 120 that is disposed closely to, i.e., beneath, the cap part 32 includes a straight side surface 119 having a maximum diameter D1 as viewed in plan and a second arcuate side surface 121 for contacting the inner wall surface of the joint hole 36 when the larger end 38 of the connecting rod 30 is set on the second mandrel 120.

The first mandrel 114 that is disposed closely to, i.e., beneath, the rod part 34 includes a straight side surface 115 having a maximum diameter D2 smaller than the maximum diameter D1 as viewed in plan, a first arcuate side surface 117 for contacting the inner wall surface of the joint hole 36 when the larger end 38 of the connecting rod 30 is set on the first mandrel 114, and a pair of straight side surfaces 123a, 123b disposed one on each side of the first arcuate side surface 117 for providing clearances between the straight side surfaces 123a, 123b and the inner wall surface of the joint hole 36.

When the larger end 38 of the connecting rod 30 is set on the first mandrel 114, the straight side surfaces 123a, 123b of the first mandrel 114 on the fixed stage are held out of contact with the inner wall surface of the joint hole 36. Therefore, the area of contact between the second mandrel 120 on the movable stage 64 and the inner wall surface of the joint hole 36 is greater than the area of contact between the first mandrel 114 on the fixed stage 62 and the inner wall surface of the joint hole 36. Since the first and second mandrels 114, 120 are differently shaped to provide different areas of contact between themselves and the inner wall surface of the joint hole 36, strains developed in the larger end 38 at the time when the larger end 38 is cracked, can appropriately be controlled as described later.

For example, the difference between the maximum diameter D1 of the second mandrel 120 and the maximum diameter D2 of the first mandrel 114 may be of a value in the range from about 1 mm to about 2 mm. In other words, the difference between the widths of the first and second mandrels 114, 120 on one side thereof may be of a value in the range from about 0.5 mm to about 1 mm.

The semicircular protrusions 114a, 120a have recesses 114b, 120b of rectangular cross section defined in respective mating surfaces thereof. When the recesses 114b, 120b are combined with each other, they jointly form a vertical through hole between the semicircular protrusions 114a, 120a. A wedge 122 of rectangular cross section engages in the vertical through hole. At this time, the semicircular protrusions 114a, 120a of the first and second mandrels 114, 120 are combined with each other, providing a substantially circular boss. The circular boss is placed in the joint hole 36 in the larger end 38 of the connecting rod 30.

A connecting plate 124 which extends vertically upwardly is fixed to an end of the slide block 118. The connecting plate 124 supports, on its surface, a pair of third air cylinders 126a, 126b horizontally spaced a predetermined distance from each other (see FIG. 3). The third air cylinders 126a, 126b have respective piston rods whose distal ends are connected by respective shafts 128 to a pair of third workpiece support members (a first support mechanism) 130a, 130b, respectively. The third workpiece support members 130a, 130b are movable back and forth on an upper flat surface of the second mandrel 120 in the axial directions of the connecting rod 30 by the respective third air cylinders 126a, 126b.

A pair of teeth 132 is mounted on axial ends of the respective third workpiece support members 130a, 130b. The teeth 132 serve to abut against the cap part 32 of the larger end 38 of the connecting rod 30 and press the connecting rod 30 parallel to its axis in a direction from the larger end 38 toward the smaller end 40. The third workpiece support members 130a, 130b have respective slanted surfaces 138 on the other ends thereof remote from the teeth 132. The slanted surfaces 138 serve to engage pressing surfaces 136 of respective fourth workpiece support members 134a, 134b.

As shown in FIGS. 2 and 3, the third workpiece support members 130a, 130b are guided by two pairs of substantially parallel second guide elements 140a through 140d fixedly mounted on the upper flat surface of the second mandrel 120 for linear displacement in the axial directions of the connecting rod 30.

A secure plate 141 is mounted on the upper surface of the slide block 118. A pair of second oil cylinders (a second support mechanism) 146a, 146b is fixedly supported on an upper plate 144 that is mounted above the secure plate 141 by a support assembly 142 (see FIG. 2). The second oil cylinders 146a, 146b have respective piston rods whose distal ends are coupled to respective fourth workpiece support members 134a, 134b each in the form of a substantially cubic block. The fourth workpiece support members 134a, 134b are vertically displaceable by the second oil cylinders 146a, 146b.

The pressure of pressure oil supplied to the second oil cylinders 146a, 146b can be changed between high and low levels by a switching valve (not shown) to change forces (thrust forces) with which to push the third workpiece support members 130a, 130b toward the cap part 32 of the connecting rod 30.

The fourth workpiece support members 134a, 134b have respective pressing side surfaces 136 for engaging the respective slanted surfaces 138 of the third workpiece support members 130a, 130b to press the third workpiece support members 130a, 130b toward the connecting rod 30.

As shown in FIG. 3, the support assembly 142 comprises a pair of first support plates 142a, 142b vertically fixed to an upper surface of the secure plate 141 and spaced from each other by a predetermined distance, the first support plates 142a, 142b extending substantially parallel to the axial directions of the connecting rod 30, a second support plate 142c extending substantially horizontally and joined to upper side wall surfaces of the first support plates 142a, 142b, and a pair of third support plates 142d, 142e extending substantially parallel to each other along and joined to a vertical surface of the second support plate 142c.

The third support plates 142d, 142e have respective ridges 148 disposed on surfaces thereof and extending vertically substantially parallel to each other. The ridges 148 slidably engage in respective slots 150 defined respectively in the fourth workpiece support members 134a, 134b, so that the fourth workpiece support members 134a, 134b can smoothly be guided for vertical movement by the ridges 148.

When the pressing surfaces 136 of the respective fourth workpiece support members 134a, 134b engage the respective slanted surfaces 138 of the third workpiece support members 130a, 130b and push the third workpiece support members 130a, 130b, the third workpiece support members 130a, 130b generate reactive forces. The reactive forces thus generated are borne by the third support plates 142d, 142e held by the vertically extending first support plates 142a, 142b.

The second bracket 68 which projects outwardly from the base 60 has a first side wall 68a with a fourth air cylinder 152 fixedly mounted thereon. The fourth air cylinder 152 has a first piston rod 152a whose distal end is connected to the connecting plate 124 for displacing the movable stage 64 in its entirety along the axial directions of the connecting rod 30.

The fourth air cylinder 152 is of the double rod type including the first piston rod 152a and a second piston rod 152b which project from the opposite ends thereof along the axis of a cylinder tube thereof, respectively. The first piston rod 152a is fixed to the connecting plate 124 joined to the slide block 118, and the second piston rod 152b has its distal end as a free end.

The first side wall 68a of the second bracket 68 supports thereon a pair of backup cylinders 153, 155 fixed thereto with the fourth air cylinder 152 disposed therebetween. The backup cylinders 153, 155 have respective piston rods 153a, 155a whose distal ends are coupled to the connecting plate 124 for displacing the movable stage 64 in its entirety along the axial directions of the connecting rod 30 to bring the fractured surface of the cap part 32 which is displaced in unison with the movable stage 64 into abutment against the fractured surface of the rod part 34 which is fixed in position, as described later.

The second bracket 68 also has a second side wall 68b with a fifth air cylinder 154 fixed thereto. The fifth air cylinder 154 has a piston rod 154a whose distal end is positioned in facing relationship to and engageable with the second piston rod 152b of the fourth air cylinder 152. When the fifth air cylinder 154 is actuated to extend the piston rod 154a, the piston rod 154a engages and presses the second piston rod 152b of the fourth air cylinder 152 to displace the movable stage 64 in its entirety horizontally.

The cracking mechanism 54 comprises the first and second mandrels 114, 120 having the respective semicircular protrusions 114a, 120a to be placed in the joint hole 36 in the larger end 38, and the wedge 122 to be pressed in for spreading the first and second mandrels 114, 120 apart from each other.

The semicircular protrusions 114a, 120a have the recesses 114b, 120b into which the wedge 122 are inserted. The recess 114b in the first mandrel 114 on the fixed stage 62 is defined by a substantially vertical wall surface, and the recess 120b in the second mandrel 120 on the movable stage 64 is defined by a tapered surface slanted outwardly in the upward direction (see FIGS. 4 and 6).

The wedge 122 has a tapered surface 122a which is progressively slanted away from a vertical plane toward the upper distal end thereof. The wedge 122 is inserted into the recesses 114b, 120b such that the tapered surface 122a is held in sliding contact with the wall surface of the second mandrel 120. When the wedge 122 is urged to move downwardly in FIG. 4, the tapered surface 122a slides against the wall surface of the second mandrel 120, and the first mandrel 114 on the fixed stage 62 and the second mandrel 120 on the movable stage 64 are slidingly spread away from each other.

Figure 7:
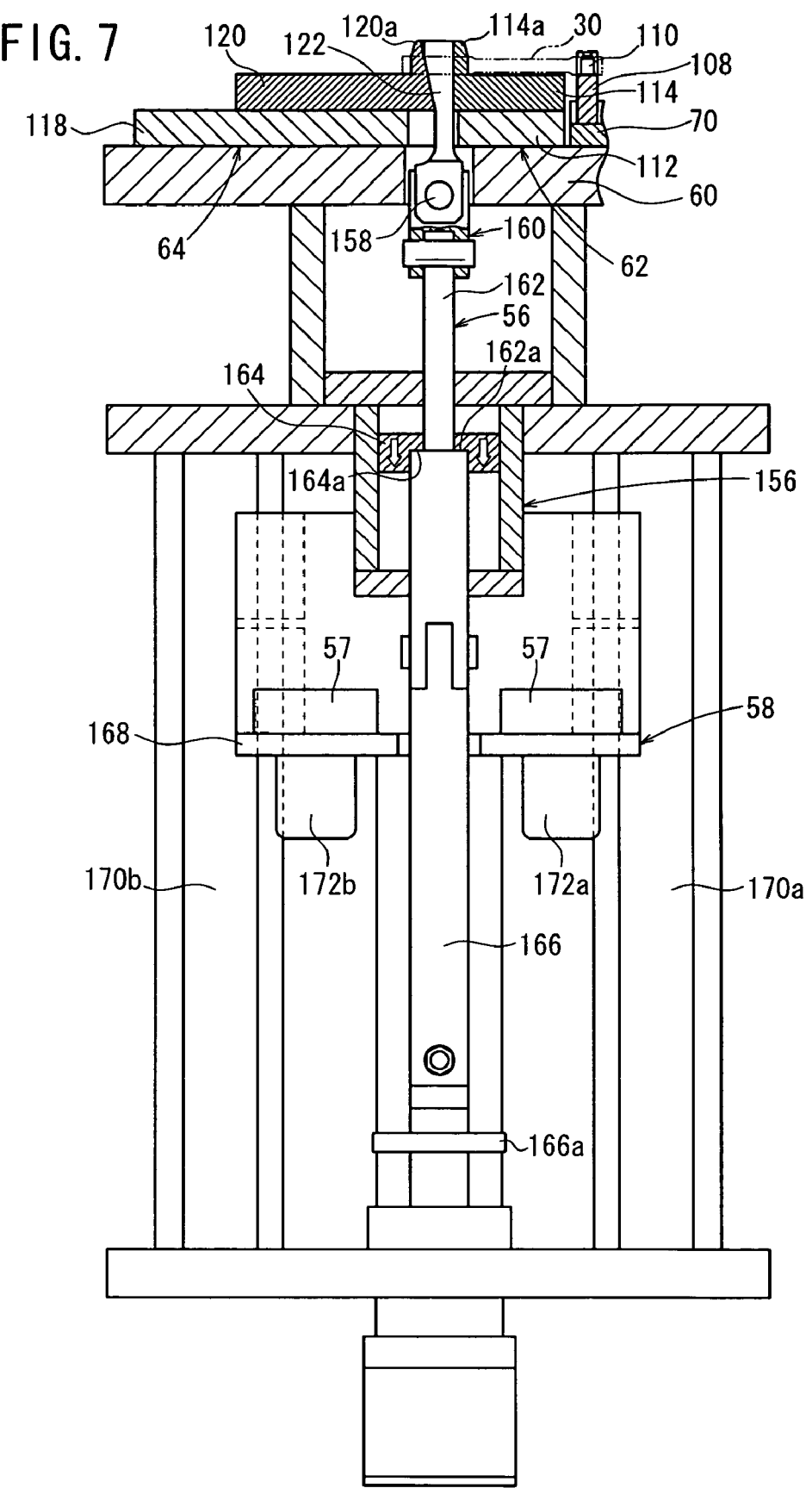
FIG. 7 is a front elevational view, partly in cross section, showing the manner in which a preload is applied by a preload applying mechanism of the cracking apparatus.
Figure 8:
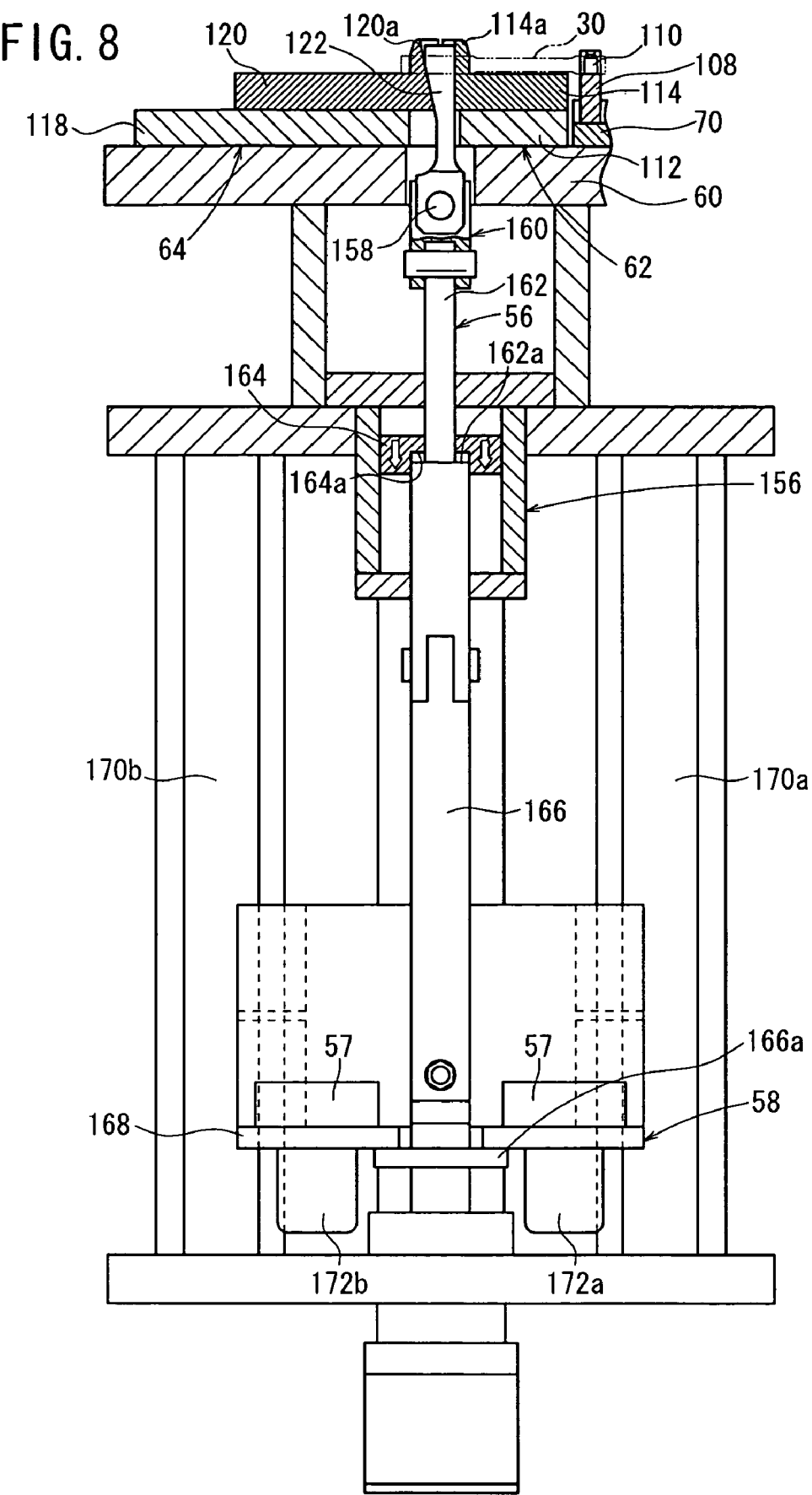
FIG. 8 is a front elevational view, partly in cross section, showing the manner in which an impact load is applied by the preload applying mechanism.

As shown in FIG. 7, the preload applying mechanism 56 has a third oil cylinder 156 for generating a preload to be applied to the wedge 122. The third oil cylinder 156 has a piston rod (a load transmitter) 162 coupled to the lower end of the wedge 122 through a joint mechanism 160 including a joint pin 158, and a piston 164 having a step 164a engaging an annular step 162a on the piston rod 162.

The piston rod 162 extends centrally through the piston 164 and is slidable with respect to the piston 164. The piston 164 is displaceable in unison with the piston rod 162 in the direction to press in the wedge 122, and is movable separately from the piston rod 162 in a direction opposite to the direction to press in the wedge 122. Stated otherwise, the third oil cylinder 156 applies the preload only in one direction (downward direction) of the piston rod 162 through the piston 164.

The preload applying mechanism 56 and the loading mechanism 58 have a common load transmitting shaft (a load transmitter) 166 connected to the wedge 122 through the piston rod 162. The shaft 166 is integral with the piston rod 162 through the step 162a, and has a flange 166a at an end thereof remote from the piston rod 162. The flange 166a is positionally adjustable in the axial directions of the shaft 166.

The loading mechanism 58 has a vertically movable table 168 supporting the weights 57 thereon and movable downwardly into hitting engagement with the flange 166a to generate an impact load to be applied to the wedge 122 via the shaft 166, a pair of guide members 170a, 170b on which the vertically movable table 168 is vertically slidably guided, and a pair of dampers 172a, 172b for absorbing shocks imposed on the vertically movable table 168 when it falls.

The loading mechanism 58 also has a stopper mechanism (not shown) for adjusting the lower end position of a downward stroke of the vertically movable table 168, a vertically movable table returning mechanism (not shown) for returning the vertically movable table 168 which has fallen, back to an upper standby position, and a returning cylinder (not shown) for returning the wedge 122 which has been displaced downwardly to crack the larger end 38 of the connecting rod 30, back to an initial position.

Figure 11:
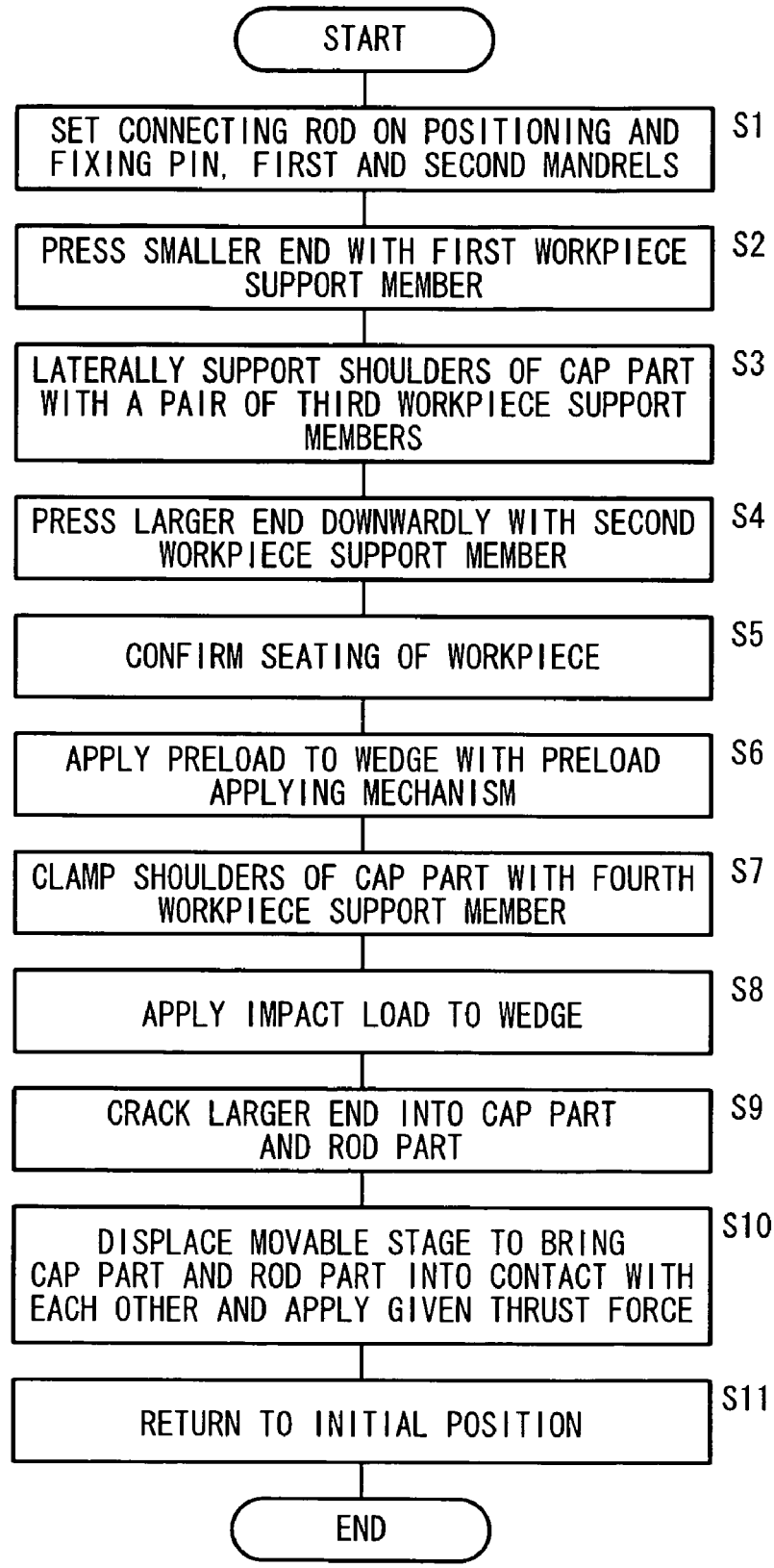
FIG. 11 is a flowchart of an operation sequence of the cracking apparatus shown in FIG. 2.

The cracking apparatus 50 according to the present embodiment of the present invention is basically constructed as described above. Operation and advantages of the cracking apparatus will be described in detail below with reference to a flowchart shown in FIG. 11.

First, the integrally formed connecting rod 30 is set in the workpiece positioning and holding mechanism 52 (see FIG. 4). At this time, the smaller end 40 is positioned by the positioning and fixing pin 110, and the joint hole 36 in the larger end 38 is fitted over the combined semicircular protrusions 114a, 120a of the first and second mandrels 114, 120 (step S1).

The connecting rod 30 thus set in position is then held in position by the workpiece positioning and holding mechanism 52. Specifically, the first oil cylinder 72 is actuated to displace the movable block 76 coupled to the distal end of the piston rod 72a toward the connecting rod 30 while the movable block 76 is being guided by the guide rail 74. The first workpiece support member 78 fixed in the groove in the movable block 76 engages the smaller end 40 of the connecting rod 30 and presses the smaller end 40 axially toward the larger end 38 (step S2).

As shown in FIG. 5, the first workpiece support member 78 moves horizontally into the recess 106 of substantially rectangular cross section defined centrally in the bifurcated fixed block 108. The engaging slot 80 of V-shaped cross section defined in the distal end of the first workpiece support member 78 engages the smaller end 40 of the connecting rod 30 coaxially along the axial direction of the connecting rod 30.

Then, the third air cylinders 126a, 126b are actuated to displace the third workpiece support members 130a, 130b, which are coupled to the distal ends of the piston rods of the third air cylinders 126a, 126b by the shafts 128, slidably axially toward the connecting rod 30 while the third workpiece support members 130a, 130b are being guided by the second guide elements 140a through 140d. The teeth 132 on the axial ends of the respective third workpiece support members 130a, 130b abut against the respective shoulders of the cap part 32 of the connecting rod 30, and press the connecting rod 30 axially in the direction from the larger end 38 toward the smaller end 40, so that the shoulders of the cap part 32 are supported laterally (horizontally) (step S3).

At this time, the teeth 132 on the axial ends of the respective third workpiece support members 130a, 130b abut against the respective shoulders of the cap part 32 of the connecting rod 30, whereby the teeth 132 lightly press the respective shoulders of the cap part 32 to bring the tilt (axis) of the connecting rod 30 into alignment with a preset positioning direction, i.e., to correct the axial direction of the connecting rod 30.

Then, the second air cylinder 94 is actuated to extend the piston rod 94a coupled to the joint member 96, turning the second workpiece support member 104 downwardly a given angle about the third pin 100. When the second workpiece support member 104 is turned the given angle, the substantially Y-shaped presser 104a on its distal end contacts the upper surface of the larger end 38 at two points near the joint hole 36 of the connecting rod 30, and presses the larger end 38 downwardly (step S4).

At this time, the protrusions of the first and second mandrels 114, 120 engage in the joint hole 36 in the larger end 38 of the connecting rod 30, and the positioning and fixing pin 110 engages in the hole in the smaller end 40. A seating confirming mechanism (not shown) confirms when the connecting rod 30 is seated on an upper flat surface of the first mandrel 114 (step S5).

Specifically, for example, the seating confirming mechanism comprises an air outlet hole defined in the upper flat surface of the first mandrel 114, and air from an air source is discharged from the air outlet hole. When the connecting rod 30 is seated on the upper flat surface of the first mandrel 114, the air outlet hole is closed, and a sensor (not shown) detects a reduction in the rate of air discharged from the air outlet hole, i.e., detects a reduction in the pressure of air discharged from the air outlet hole. Therefore, the seating of the connecting rod 30 on the upper flat surface of the first mandrel 114 can reliably be confirmed based on a signal from the sensor.

Then, the third oil cylinder 156 of the preload applying mechanism 56 is actuated to displace the piston 164 downwardly. The downward displacement of the piston 164 causes the step 162a engaging the step 164a to move the piston rod 162 downwardly (see FIG. 7). At the same time, the piston rod 162 displaces downwardly the wedge 122 coupled thereto, thereby applying a preload to the wedge 122 (step S6).

The wedge 122 which is sandwiched by the semicircular protrusions 114a, 120a is pressed into the recesses 114b, 120b. When the wedge 122 is pressed downwardly, the tapered surface of the second mandrel 120 which defines the recess 120b and the tapered surface 122a of the wedge 122 slide against each other, slightly spreading the first and second mandrels 114, 120 apart from each other. The protrusion 114a of the first mandrel 114 and the protrusion 120a of the second mandrel 120 are horizontally spaced a given distance from each other, and pressed against the respective inner surface of the joint hole 36.

Since the straight side surfaces 123a, 123b of the first mandrel 114 on the fixed stage 62 are kept out of contact with the inner wall surface of the joint hole 36, the area of contact between the second mandrel 120 on the movable stage 64 and the inner wall surface of the joint hole 36 is greater than the area of contact between the first mandrel 114 on the fixed stage 62 and the inner wall surface of the joint hole 36. As a consequence, the load applied to the joint hole 36 is greater on the cap part 32 held in contact with the second mandrel 120 than on the rod part 34 held in contact with the first mandrel 114.

The preload that is applied to the wedge 122 at this time is set to such a level that the larger end 38 is not fractured even when the protrusions 114a, 120a are pressed against the respective inner surface of the joint hole 36, i.e., a level which allows the larger end 38 to be elastically deformable. Accordingly, the larger end 38 and the protrusions 114a, 120a of the first and second mandrels 114, 120 are prevented from wobbling with respect to each other, and the connecting rod 30 as a workpiece is securely held in position by the protrusions 114a, 120a of the first and second mandrels 114, 120.

With the preload being applied to the joint hole 36 in the larger end 38 of the connecting rod 30, the second oil cylinders 146a, 146b are actuated to displace the fourth workpiece support members 134a, 134b, each in the form of a block, vertically downwardly. At this time, the ridges 148 on the third support plates 142d, 142e of the support assembly 142 engage in the respective slots 150 defined respectively in the sides of the fourth workpiece support members 134a, 134b which confront the third support plates 142d, 142e, guiding the fourth workpiece support members 134a, 134b to move smoothly in the downward direction (see FIG. 3).

When the fourth workpiece support members 134a, 134b are lowered, the pressing surfaces 136 of the respective fourth workpiece support members 134a, 134b slidingly engage the respective slanted surfaces 138 on the ends of the third workpiece support members 130a, 130b, pushing the third workpiece support members 130a, 130b toward the cap part 32 of the connecting rod 30 (step S7).

As a result, the cap part 32 of the connecting rod 30 is completely locked in position between the third workpiece support members 130a, 130b which are pressed vertically downwardly by the fourth workpiece support members 134a, 134b to support the respective shoulders of the cap part 32, and the protrusion 120a of the second mandrel 120 between the shoulders of the cap part 32.

With the cap part 32 of the connecting rod 30 being locked firmly in position, a stopper for the vertically movable table 168 is released, and thereafter the vertically movable table 168 and the weights 57 drop while being guided by the guide members 170a, 170b. When the vertically movable table 168 impinges on the flange 166a on the shaft 166, the shaft 166 is urged to move downwardly, applying an impact load to the wedge 122 (see FIG. 8) (step S8). At this time, since the piston 164 of the third oil cylinder 156 is movable with respect to the shaft 166 in the direction opposite to the direction in which the wedge 122 is pressed in, i.e., the direction in which the impact load is applied, the impact load is not attenuated by the third oil cylinder 156, but is reliably imparted to the wedge 122.

Figure 9:
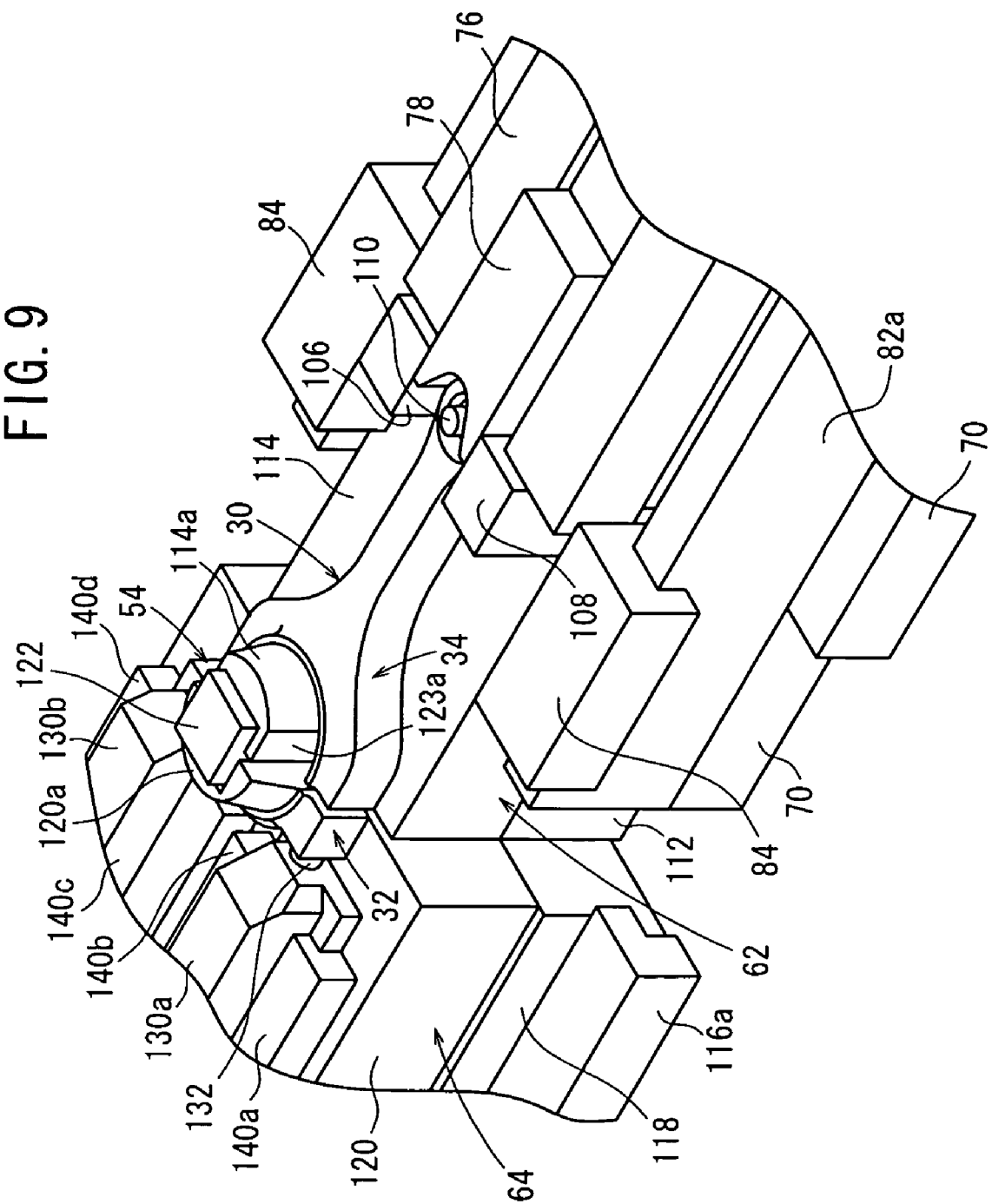
FIG. 9 is an enlarged fragmentary perspective view showing the manner in which a connecting rod is fractured into a cap part and a rod part.
Figure 10:
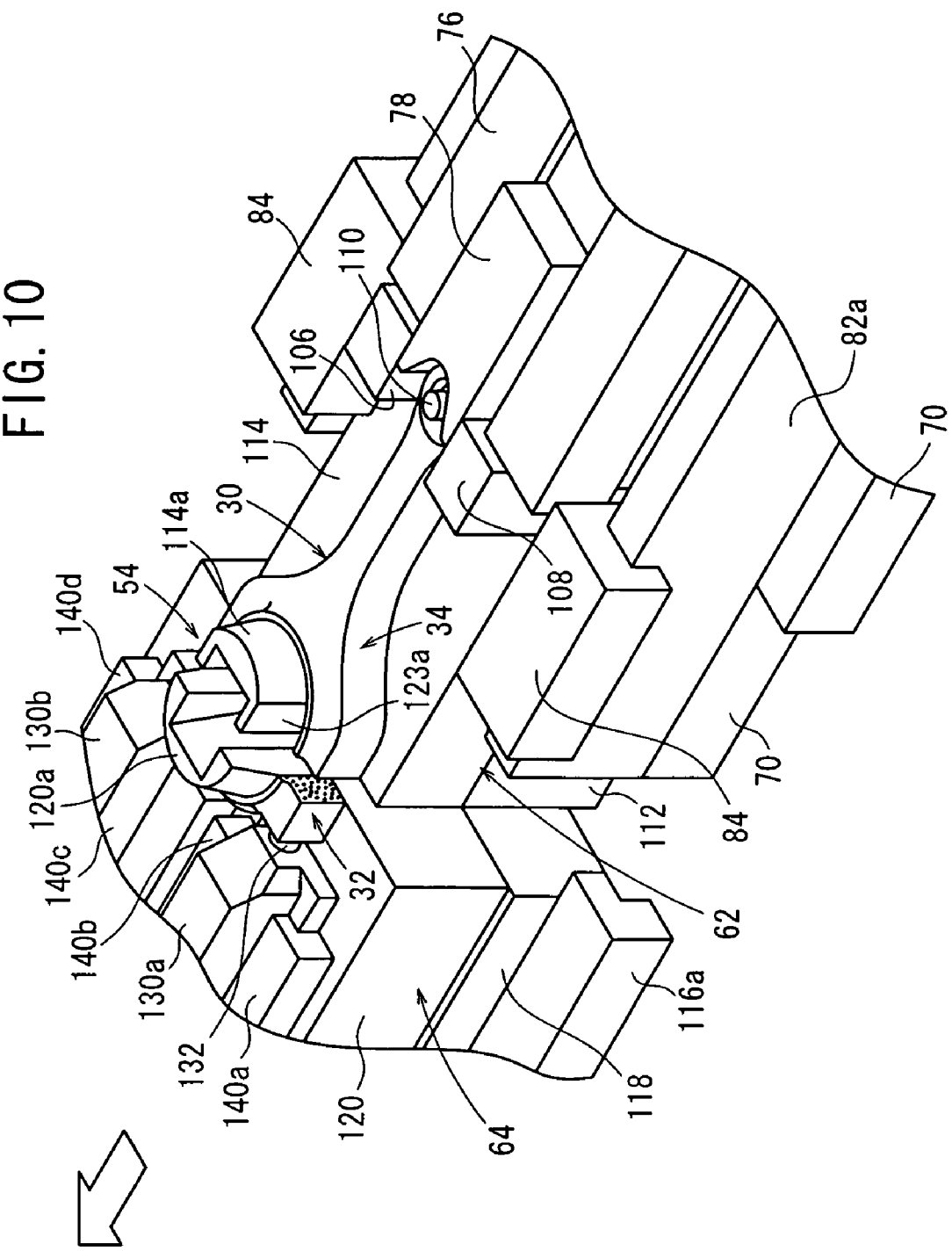
FIG. 10 is an enlarged fragmentary perspective view showing the manner in which the connecting rod is fractured into the cap and the rod.

Under the applied impact load, the wedge 122 is further pressed into the recesses 114b, 120b of the first and second mandrels 114, 120. The tapered surface of the second mandrel 120 which defines the recess 120b and the tapered surface 122a of the wedge 122 slide against each other, further spreading the first and second mandrels 114, 120 apart from each other. When the first and second mandrels 114, 120 are thus spaced away from each other substantially horizontally, the larger end 38 is deformed beyond its elastically deformable range and cracked at the cracking regions 44 where stresses are concentrated into the cap part 32 and the rod part 34 (see FIGS. 9 and 10) (step S9). Since the cap part 32 is held by the teeth 132 on the third workpiece support members 130a, 130b under the pressure from the second oil cylinders 146a, 146b, the fractured cap part 32 is prevented from being scattered around.

Specifically, with the first mandrel 114 on the fixed stage 62 being fixed in position, when the given impact load is applied to the wedge 122, the second mandrel 120 on the movable stage 64 is slidingly displaced in unison with the slide block 118 on the base 60 while being guided by the first guide elements 116a, 116b.

In other words, the rod part 34 of the connecting rod 30 is fixedly mounted on the fixed stage 62 by the first mandrel 114, the positioning and fixing pin 110 and the first workpiece support member 78, and the cap part 32 is firmly locked in position by the fourth workpiece support members 134a, 134b, the third workpiece support members 130a, 130b, and the second mandrel 120. When the second mandrel 120 and the slide block 118 of the movable stage 64 are then slidingly displaced on the base 60 away from the fixed stage 62, the larger end 38 of the connecting rod 30 is cracked into the cap part 32 and the rod part 34.

After the larger end 38 of the connecting rod 30 is cracked into the cap part 32 and the rod part 34, the non-illustrated returning cylinder is actuated to lift the wedge 122 back to its initial position.

When the upper end of the wedge 122 projects upwardly a predetermined distance from the upper surfaces of the cap part 32 and the rod part 34, the fourth air cylinder 152 and the backup cylinders 153, 155, whose respective piston rods 152a, 153a, 155a have their distal ends fixed to the movable stage 64 by the second bracket 68, are actuated substantially at the same time to extend the piston rods 152a, 153a, 155a to displace the movable stage 64 toward the fixed stage 62, thereby bringing the fractured surface of the cap part 32 and the fractured surface of the rod part 34 into abutting engagement with each other.

Figure 12:
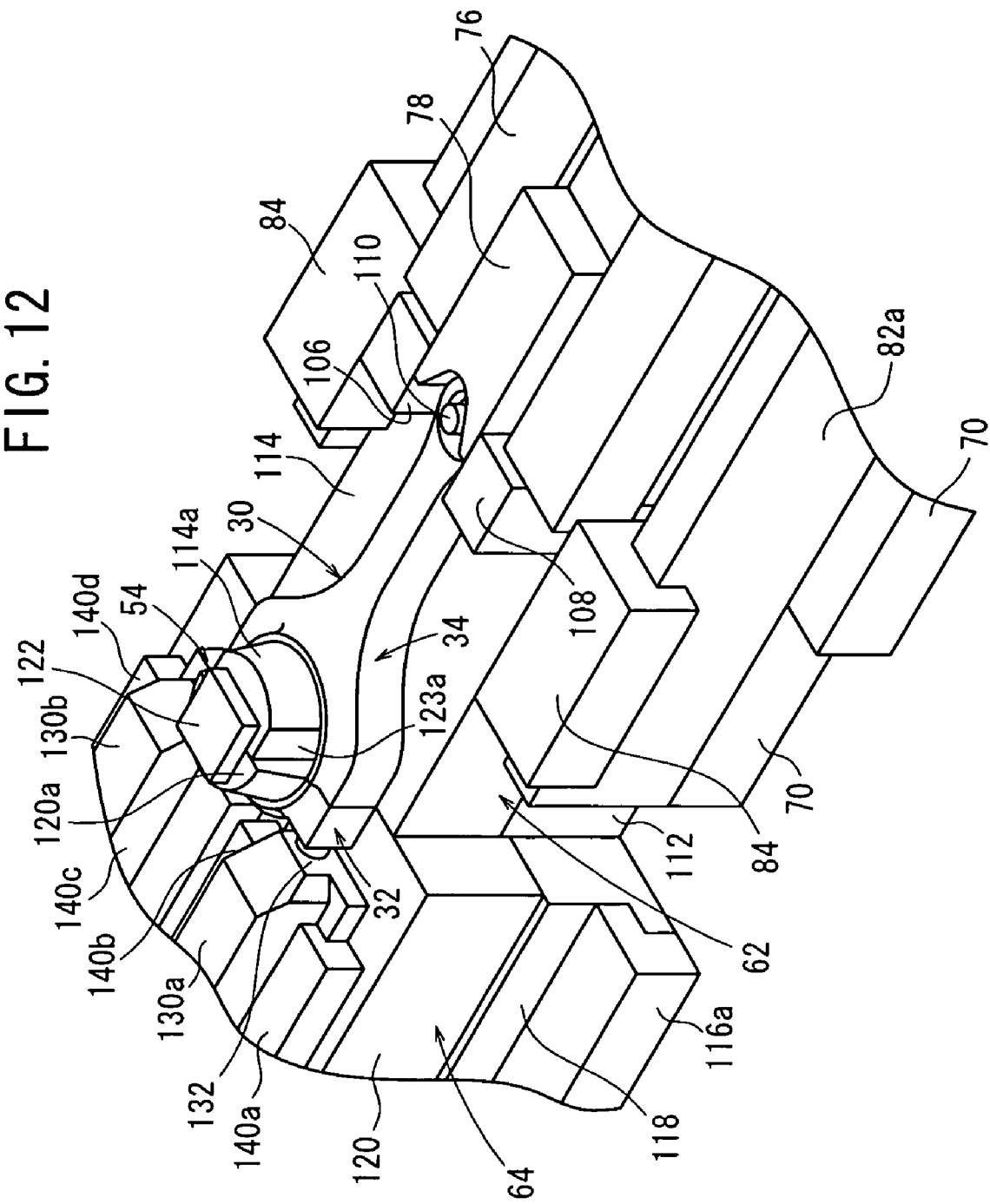
FIG. 12 is an enlarged fragmentary perspective view showing the manner in which a fractured surface of the cap part and a fractured surface of the rod part are pressed against each other.

With the cap part 32 and the rod part 34 being in abutment against each other, the non-illustrated switching valve is operated to change the pressure of pressure oil supplied to the first oil cylinder 72, from a low level to a high level to increase the force (thrust force) with which to press the smaller end 40 of the connecting rod 30 axially toward the larger end 38 thereof. At the same time, the non-illustrated switching valve is operated to change the pressure of pressure oil supplied to the second oil cylinders 146a, 146b, from a low level to a high level to increase the force (thrust force) with which to press the third workpiece support members 130a, 130b toward the cap part 32 of the connecting rod 30. As a result, as shown in FIG. 12, the fractured surface of the cap part 32 and the fractured surface of the rod part 34 are placed in abutting engagement with each other under the desired thrust force (step S10). Stated otherwise, after the fractured surface of the cap part 32 and the fractured surface of the rod part 34 are brought into abutting engagement with each other, the thrust forces (pressing forces) applied to the mating fractured surfaces are simultaneously changed from the low level to the high level to appropriately promote removal or release of fragments which may be produced in the mating fractured surfaces.

Figure 13A:
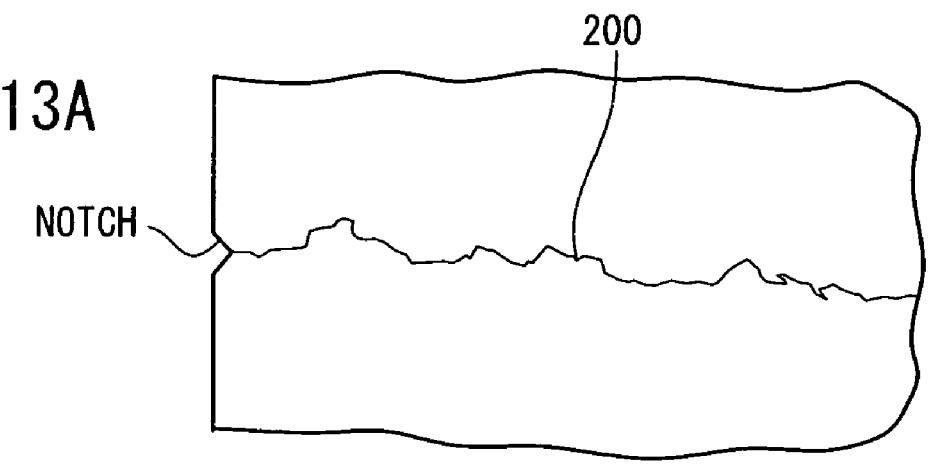
FIGS. 13A through 13C are enlarged partial front elevational views showing progressive steps in which a crack develops from a fractured surface into auxiliary cracks, which are propagated to produce a fragment that comes off.
Figure 13B:
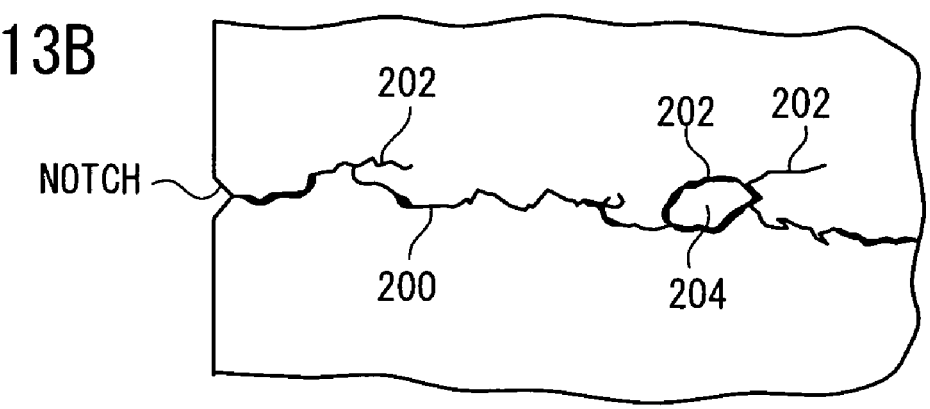
Figure 13C:
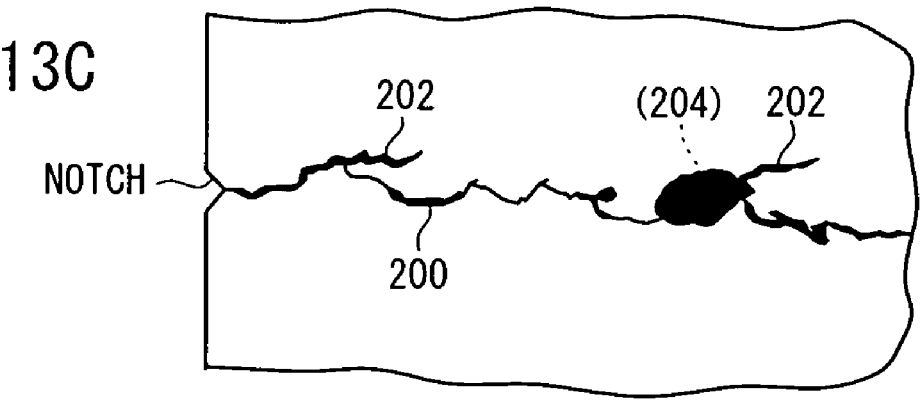

As shown in FIGS. 13A through 13C, when the larger end 38 is fractured into the cap part 32 and the rod part 34, a main crack 200 is propagated to cause a brittle fracture (see FIG. 13A). During the propagation of the main crack 200, the main crack 200 tends to branch into small auxiliary cracks 202. When the connecting rod 30 is assembled in an internal combustion engine or when the internal combustion engine incorporating the connecting rod 30 is operated, the auxiliary cracks 202 grow or are propagated together, giving rise to a region 204 where there is almost no contact between the fractured surface of the cap part 32 and the fractured surface of the rod part 34 (see FIG. 13B). The region 204 is so brittle that when a load (stress) is applied to the region 204 for some reason, the region 204 comes off as a fragment, as shown in FIG. 13C.

According to the present embodiment, immediately after the connecting rod 30 is cracked into the cap part 32 and the rod part 34 by the dropping wedge 122, the fourth air cylinder 152 and the backup cylinders 153, 155 are actuated substantially simultaneously to displace the movable stage 64 toward the fixed state 62. After the fractured surface of the cap part 32 and the fractured surface of the rod part 34 have been brought into abutment against each other, the desired thrust forces are applied to the mating fractured surfaces to release fragments produced in the mating fractured surfaces or promote the release of fragments produced in the mating fractured surfaces.

As described above, immediately after the connecting rod 30 is cracked into the cap part 32 and the rod part 34, the cap part 32 and the rod part 34 are held respectively by the movable stage 64 and the fixed stage 62. Then, the movable stage 64 is displaced toward the fixed stage 62 to bring the fractured surface of the cap part 32 into abutment against the fractured surface of the rod part 34. The mating fractured surfaces are further pressed together to remove fragments produced in the mating fractured surfaces or promote the release of fragments produced in the mating fractured surfaces.

After the release of fragments has been promoted in the connecting rod 30, the fragments can reliably be removed from the fractured surfaces by a metal brush, an adhesive tape, a suction machine, or a vibrator in a next process. Specifically, if a metal brush is used, then the fractured surfaces are brushed by the metal brush to remove fragments from the fractured surfaces. If an adhesive tape is used, then the adhesive tape is applied to the fractured surfaces and then peeled off from the fractured surfaces, thereby enabling fragments to be adhered to the tape so as to remove fragments from the fractured surfaces. If a suction machine is used, then a negative pressure is applied by the suction machine to the fractured surfaces to remove fragments from the fractured surfaces. In either case, the fragments can reliably be removed from the fractured surfaces.

After fragments have been removed from the fractured surface of the cap part 32 and the fractured surface of the rod part 34, or after the removal of fragments from the fractured surface of the cap part 32 and the fractured surface of the rod part 34 has been promoted, the first oil cylinder 72 and the second oil cylinders 146a, 146b which have applied the thrust forces to the cap part 32 and the rod part 34 are inactivated to release the mating fractured surfaces of the connecting rod 30 from the thrust forces. As a result, the mating fractured surfaces of the cap part 32 and the rod part 34 are slightly spaced from each other, allowing fragments produced in the mating fractured surfaces to be smoothly released.

Then, the first oil cylinder 72, the second oil cylinders 146a, 146b, the second air cylinder 94, the third air cylinders 126a, 126b, the fourth air cylinder 152, and the backup cylinders 153, 155 are actuated to return the first through fourth workpiece support members 78, 104, 130a, 130b, 134a, 134b substantially simultaneously to their initial positions (step S11).

After the components which have restrained the cap part 32 and the rod part 34 of the fractured connecting rod 30 have been returned to their initial positions, thereby releasing the connecting rod 30, the cap part 32 and the rod part 34 are gripped by respective chuck mechanisms mounted on arms of a multiaxis robot (not shown), and transferred thereby to a next process. Finally, the fifth air cylinder 154 is actuated to displace the movable stage 64 back to its initial position.

Figure 14:
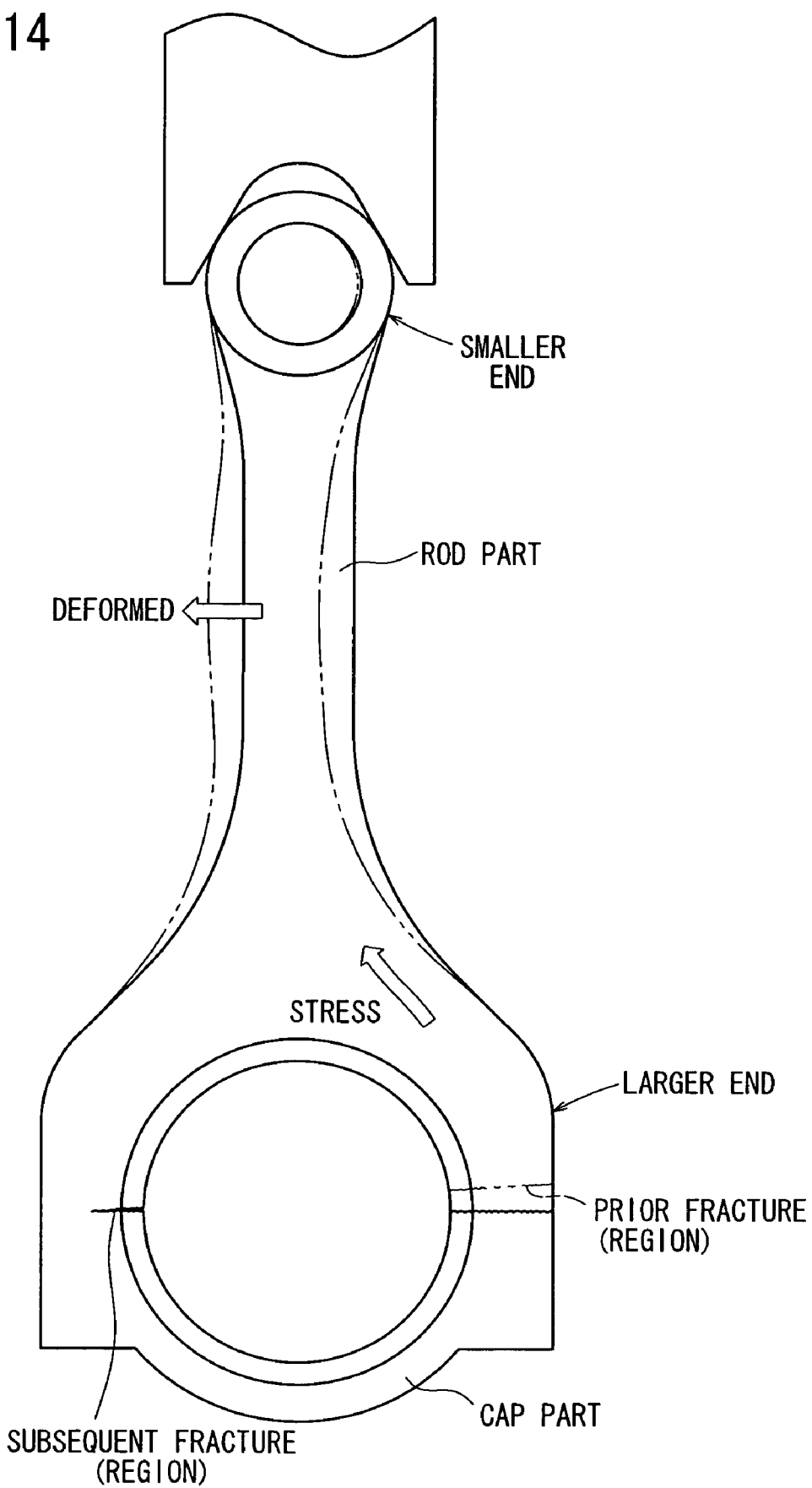
FIG. 14 is a plan view of a connecting rod, illustrative of how the connecting rod is adversely affected by the time lag between a prior fracture and a subsequent fracture when the connecting rod is fractured into a cap part and a rod part.

For example, as shown in FIG. 14, when a larger end is cracked into a cap part and a rod part by a conventional cracking apparatus (not shown), if there is a time lag between a prior fracture (region) and a subsequent fracture (region), then stresses from the prior fracture act on the rod part, applying a force tending to deform the rod part toward the subsequent fracture region. As a result, the rod part is deformed as indicated by the two-dot-and-dash lines in FIG. 14, and also the hole in the smaller end is deformed. The connecting rod 30 is required to have high dimensional accuracy with respect to the configuration of the rod part and the configuration of the hole in the smaller end because of desired product characteristics thereof.

Stated otherwise, when the integrally formed connecting rod 30 is cracked into two parts, i.e., the cap part 32 and the rod part 34, bending stresses act on a portion of the cracked parts, and as a result, the cracked surfaces tend to be distorted partly or the accuracy of the parts tends to be adversely affected. Specifically, each of the two parts has two legs after it has been cracked. When the parts are cracked, their cracking does not progress simultaneously in the legs. Instead, one of the legs starts to be cracked earlier, and then other leg starts to be cracked with a slight time lag. When the cracking of one of the legs which is fractured earlier is finished, the cracking of the other leg which is fractured subsequently is still in progress. In a final phase of the cracking of the other leg, the parts begin to be separated from each other in the leg which has been cracked earlier.

On the other hand, according to the present embodiment, the rod part 34 of the larger end 38 is fixed to the fixed stage 62, and the cap part 32 is firmly fixed to the movable stage 64 by the third workpiece support members 130a, 130b and the second oil cylinders 146a, 146b which lock the third workpiece support members 130a, 130b.

Under the above circumstances, when the larger end 38 of the connecting rod 30 is cracked into the cap part 32 and the rod part 34, only the cap part 32 is displaced in unison with the movable stage 64. Therefore, any time lag between the prior fracture and the subsequent fracture at the fractured surfaces of the cap part 32 and the rod part 34 is minimized.

According to the present embodiment, therefore, there is no need to establish a timing to release the external pressure, and any time lag between the prior fracture and the subsequent fracture is minimized.

Figure 15:
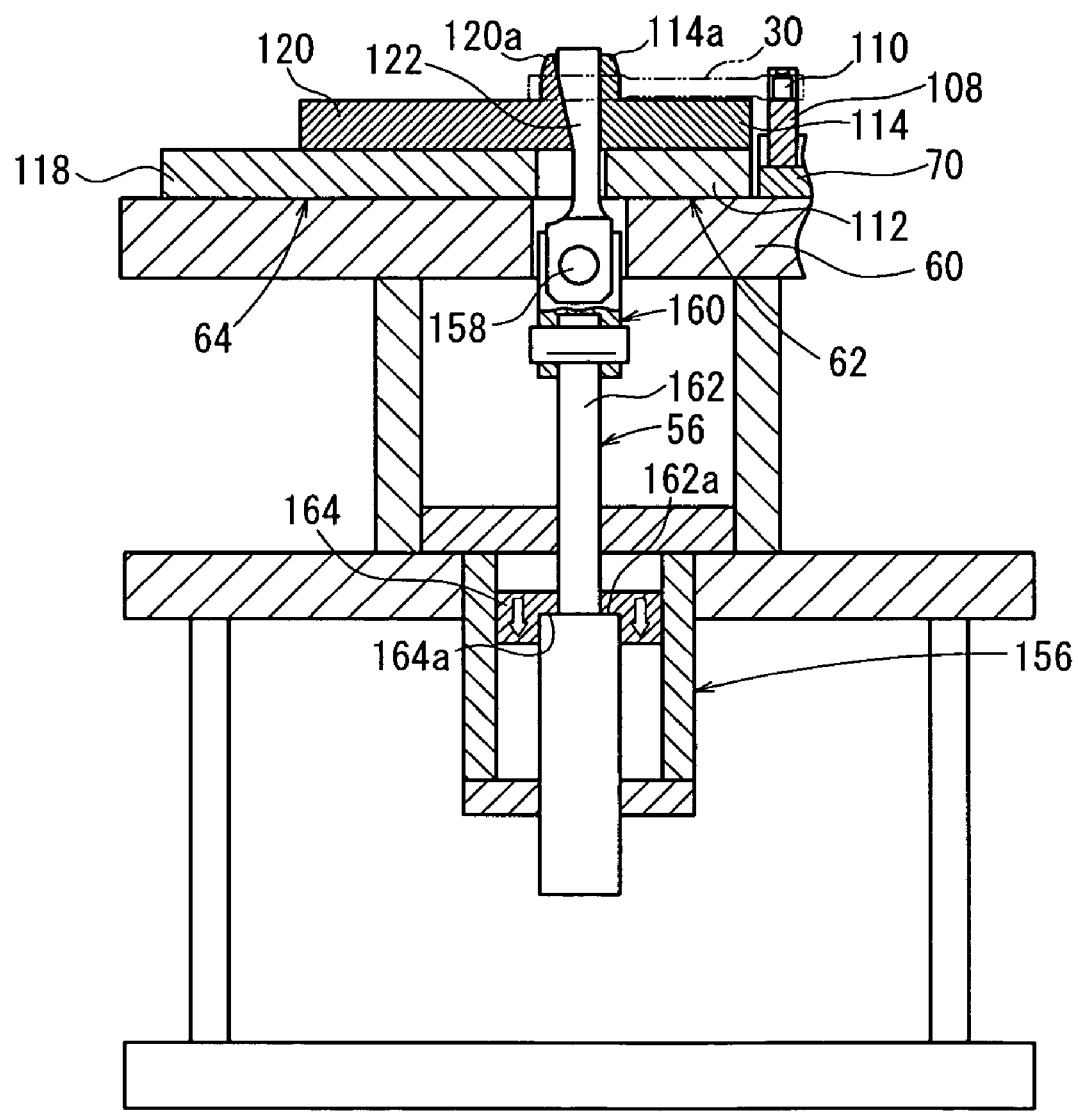
FIG. 15 is a vertical cross-sectional view of a cracking apparatus according to another embodiment of the present invention.

According to the present embodiment, furthermore, the connecting rod 30 is cracked by the impact load that is generated when the weights drop. However, generation of the impact load is not limited to the above technique of dropping the weights. FIG. 15 shows a cracking apparatus according to another embodiment of the present invention in which the third oil cylinder 156 functioning as a single actuator pulls the wedge 122 downwardly, thereby applying an impact load to the wedge 122.

Figure 16:
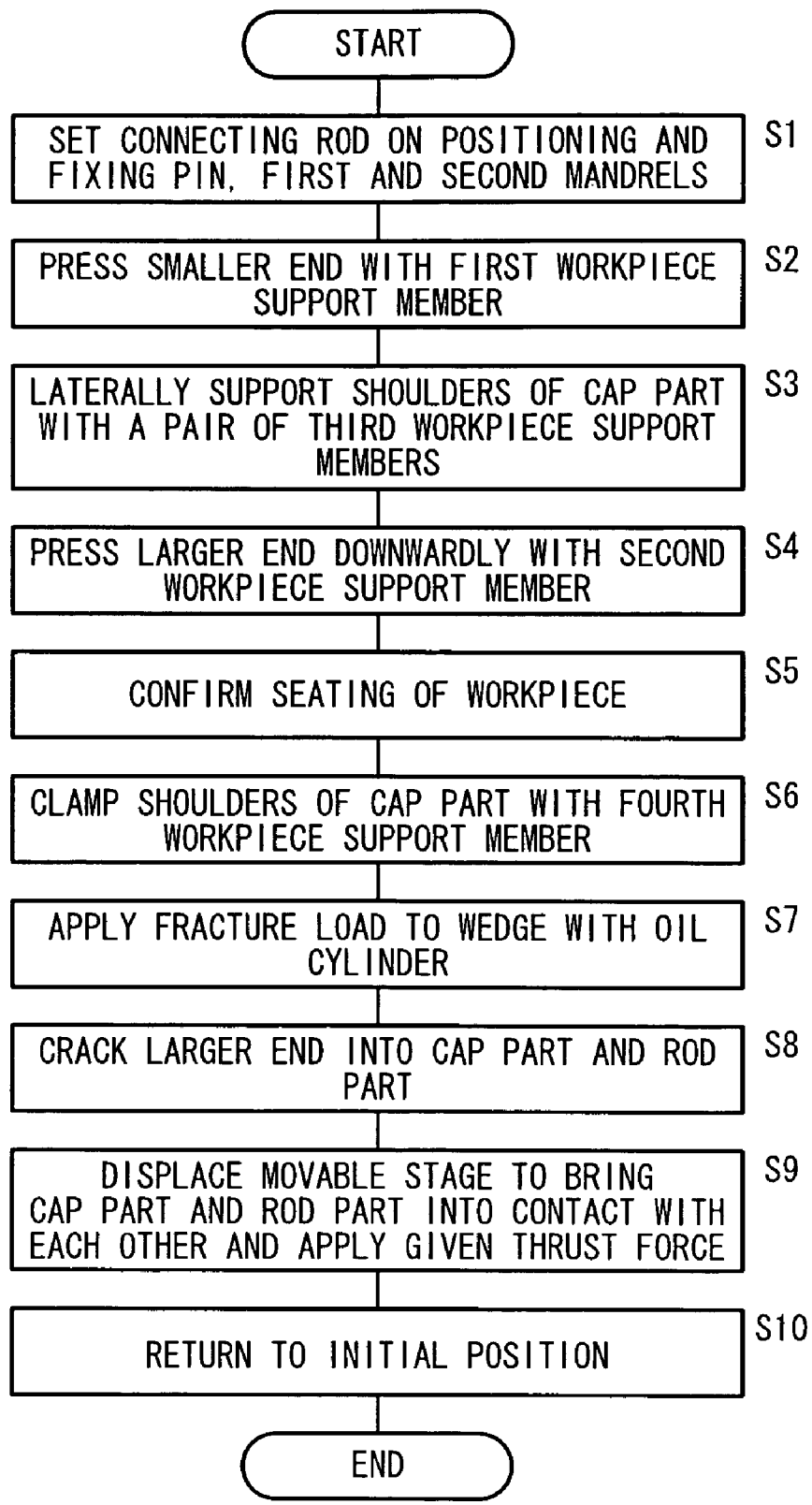
FIG. 16 is a flowchart of an operation sequence of the cracking apparatus shown in FIG. 15.

In this case, as shown in FIG. 16, no preload needs to be applied to the wedge 122, and the actuating force (pulling force) applied by the third oil cylinder 156 can be gradually increased to crack the larger end 38 into the cap part 32 and the rod part 34 (see step S7).

The general relationship between the direction of inward strains under clamping forces on the larger end 38 of the connecting rod 30 and the direction in which crack lines L travel when the larger end 38 is cracked, is illustrated in FIGS. 21A, 21B and 22A, 22B.

Figure 21B:
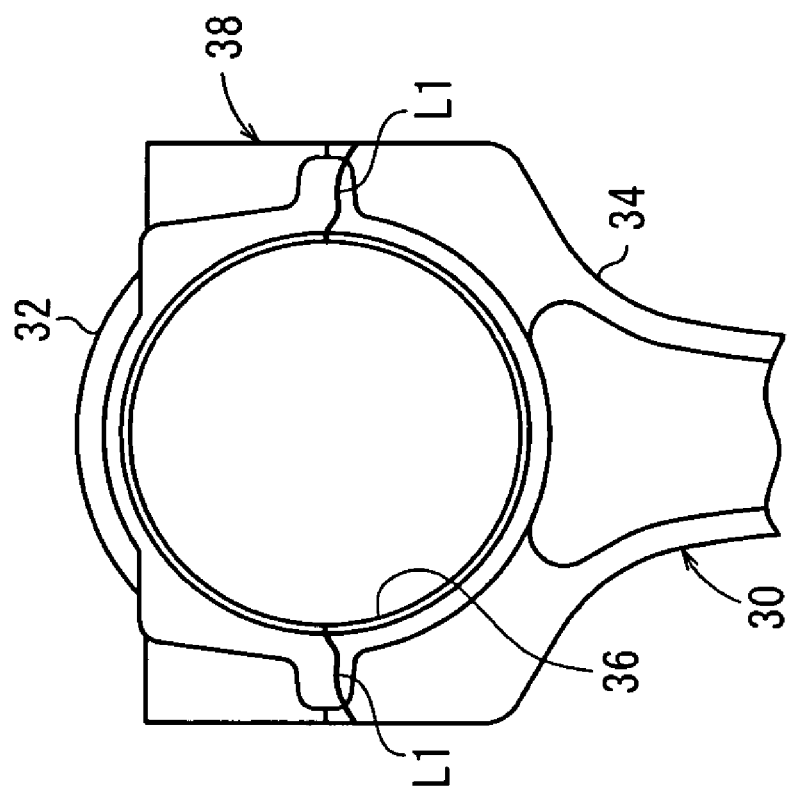
FIG. 21B is a fragmentary plan view showing the manner in which crack lines travel obliquely downwardly in the connecting rod shown in FIG. 21A.
Figure 21A:
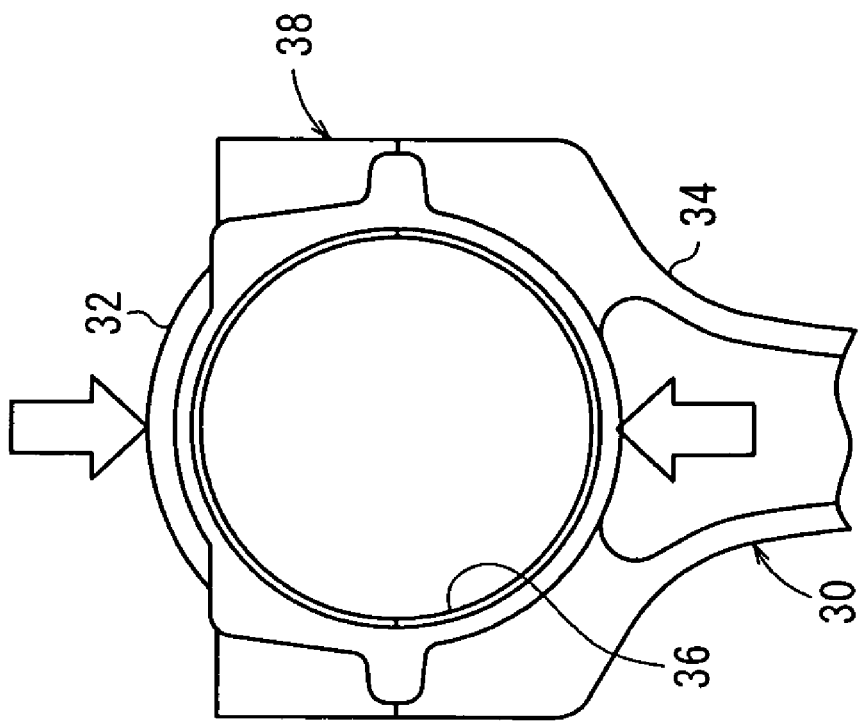
FIG. 21A is a fragmentary plan view showing the manner in which a vertical inward strain is applied to a connecting rod.

FIG. 21A shows the manner in which a vertical inward strain is applied to the connecting rod 30 as indicated by the arrows when clamping forces are applied vertically to the larger end 38, and FIG. 21B shows the manner in which crack lines L1 travel obliquely downwardly toward the rod part 34 of the connecting rod 30 when the larger end 38 is cracked.

FIG. 22A shows the manner in which a horizontal inward strain is applied to the connecting rod 30 as indicated by the arrows when clamping forces are applied horizontally to the larger end 38, and FIG. 22B shows the manner in which crack lines L2 travel obliquely upwardly toward the cap part 32 of the connecting rod 30 when the larger end 38 is cracked.

The inward strain applied to the workpiece can thus generally be controlled depending on the clamping forces that are applied to the larger end 38 of the connecting rod 30.

The present embodiments are based on study and experimentation on the relationship between the areas of contact of the cap part 32 and the rod part 34 and the directions in which the crack lines travel, by reference to the relationship between the clamping forces and the inward strains.

Figure 23:
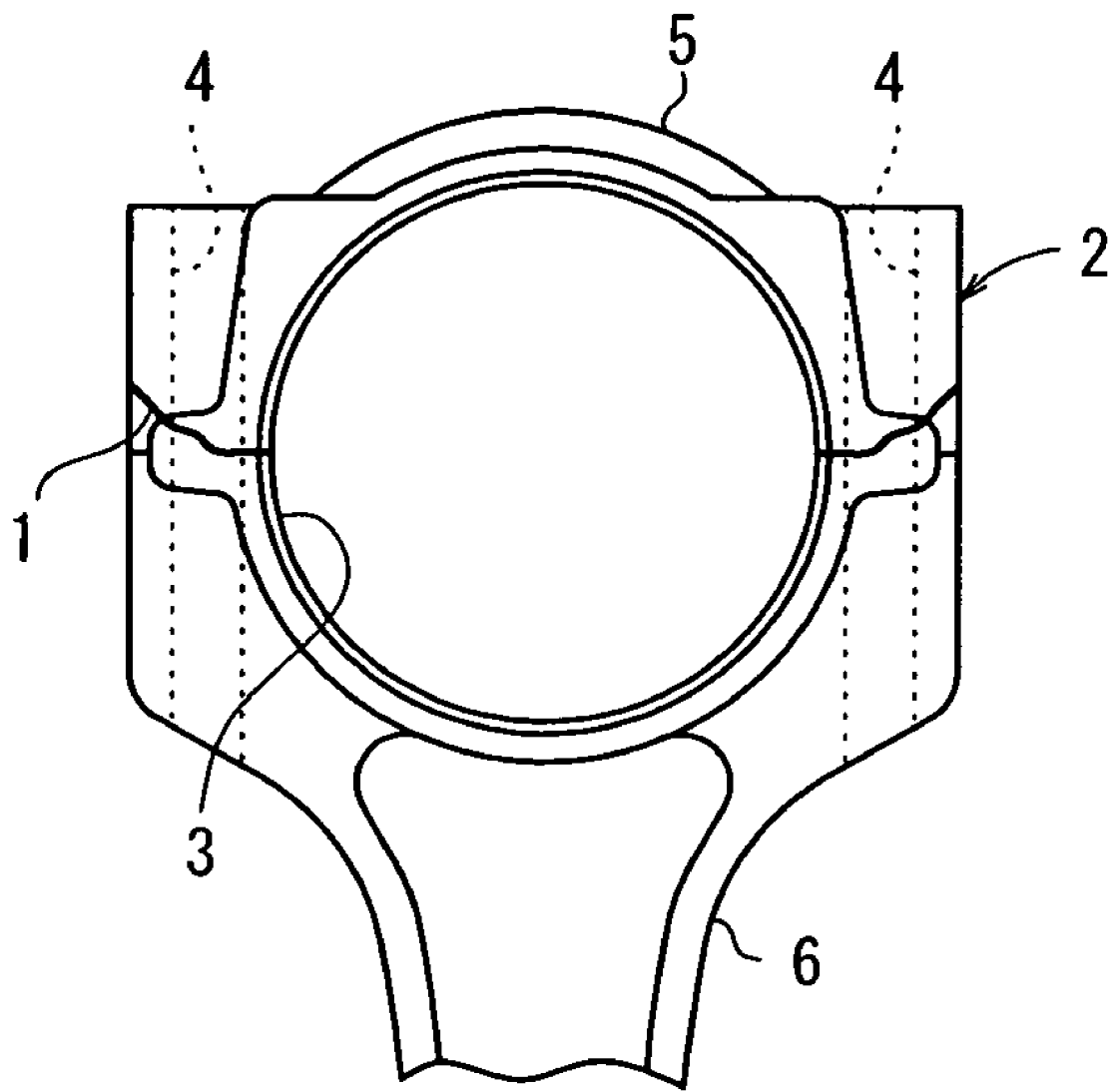
FIG. 23 is a fragmentary plan view showing the manner in which crack lines travel when a connecting rod having bolt holes displaced off the centers of fractured surfaces is cracked by the cracking apparatus of the related art.

Specifically, as shown in FIG. 23, since the crack lines 1 travel across and from the bolt holes 4 upwardly toward the cap part 5, it is estimated that an inward strain is developed horizontally in the larger end 38. In order to prevent the crack lines 1 from traveling upwardly, the straight side surfaces 123a, 123b of the first mandrel 114 are held out of contact with the inner wall surface of the joint hole 36, so that the area of contact between the second mandrel 120 on the movable stage 64 and the inner wall surface of the joint hole 36 is greater than the area of contact between the first mandrel 114 on the fixed stage 62 and the inner wall surface of the joint hole 36.

As described above, the first and second mandrels 114, 120 are differently shaped to provide different areas of contact between themselves and the inner wall surface of the joint hole 36. Consequently, even though the central axes of the bolt holes 42a, 42b are held out of alignment with the centers of the fractured surfaces, but displaced off the centers of the fractured surfaces radially inwardly toward the joint hole 36 by a predetermined distance because of the engine type incorporating the connecting rod 30, the inward strain developed in the larger end 38 when it is cracked, can appropriately be controlled to orient the crack lines substantially horizontally between the cap part 32 and the rod part 34.

Stated otherwise, according to the present embodiment, the magnitude of the fracture load applied to the fractured surfaces and the clamping forces are not changed, but the areas of contact between the first and second mandrels 114, 120 and the inner wall surfaces of the joint hole 36 are made different from each other thereby to appropriately control the direction of cracks (the direction in which the crack lines travel) caused by the inward strain after the larger end 38 is cracked.

Figure 19:
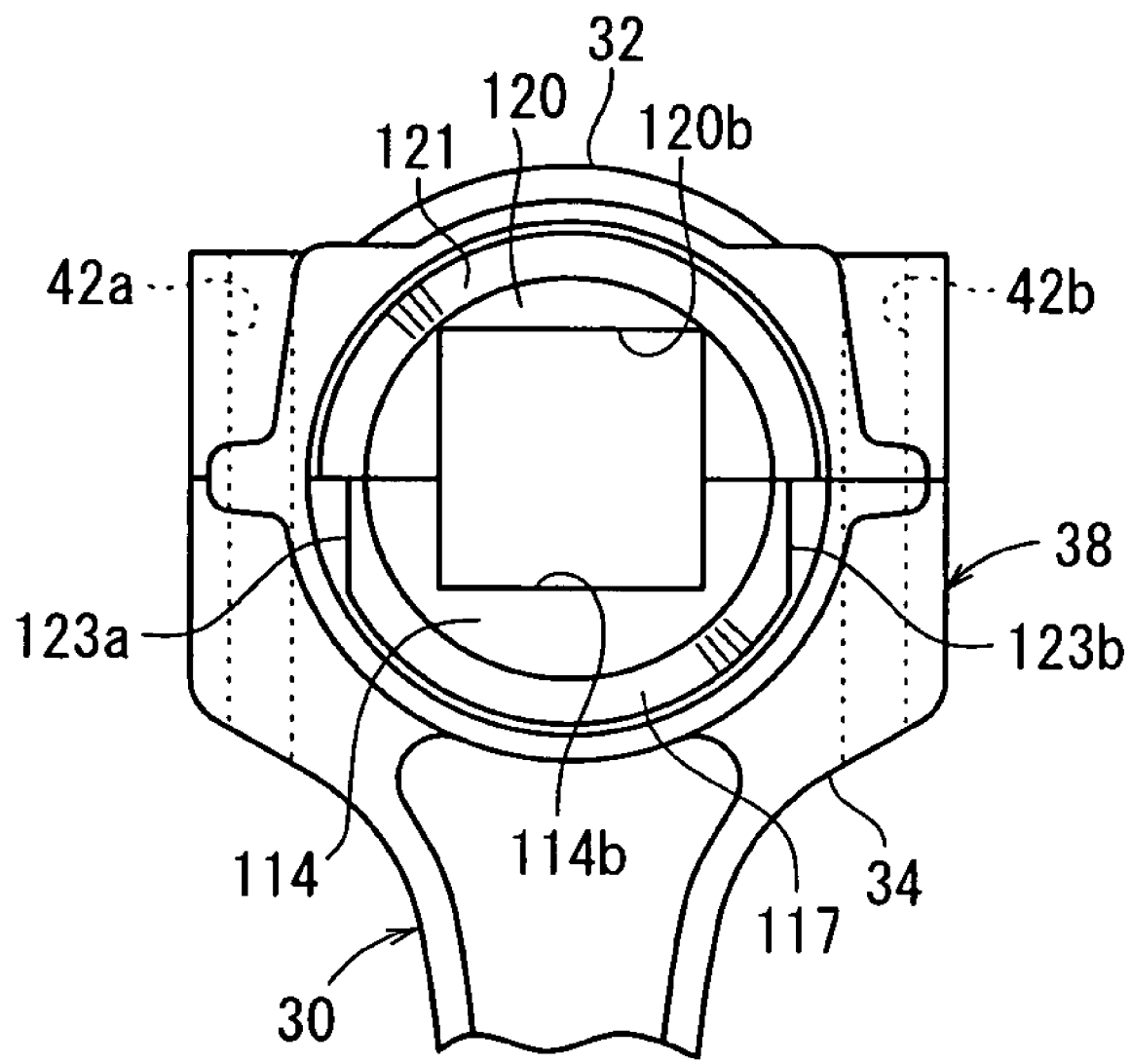
FIG. 19 is a fragmentary plan view showing the manner in which the larger end of a connecting rod is set on first and second mandrels of the cracking apparatus shown in FIG. 2.
Figure 20:
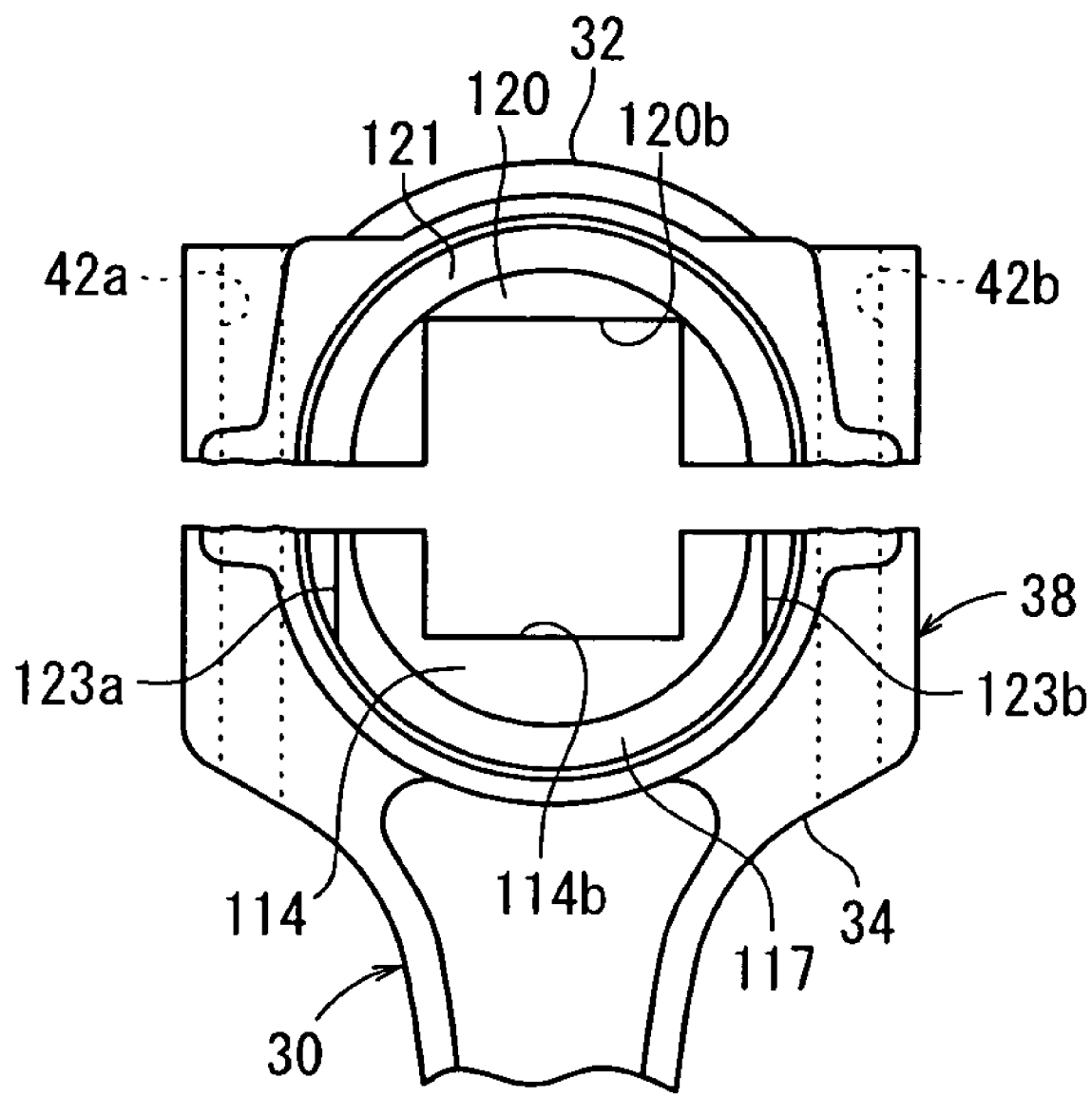
FIG. 20 is a fragmentary plan view showing the manner in which the first and second mandrels of the cracking apparatus shown in FIG. 2 are moved apart from each other to crack the connecting rod into a cap part and a rod part.

As a result, even though the central axes of the bolt holes 42a, 42b defined in the larger end 38 on the respective sides of the joint hole 36 are displaced off the centers of the fractured surfaces radially inwardly toward the joint hole 36 by a certain distance, the direction in which the crack lines travel, i.e., the direction along which the fractured surfaces extend, is not oriented upwardly (see FIG. 21B) or downwardly (see FIG. 22B), but oriented substantially horizontally, so that the larger end 38 can appropriately be cracked into the cap part 32 and the rod part 34 (see FIGS. 19 and 20).

The invention claimed is:

1. An apparatus for manufacturing a connecting rod by integrally forming a connecting rod having a larger end and a smaller end, setting a joint hole in the larger end over a pair of spreaders, and spreading the spreaders apart from each other to crack the larger end into a cap part and a rod part, the apparatus comprising:
   a fixed stage fixedly mounted on a base;
   a movable stage disposed in facing relation to said fixed stage and horizontally movable toward and away from said fixed stage;
   a first spreader mounted on said fixed stage;
   a second spreader mounted on said movable stage for displacement in unison with said movable stage; and
   a loading mechanism for applying a fracture load to move said spreaders away from each other to crack said larger end;
   wherein said larger end has a pair of fastening holes defined therein on respective horizontal sides of said larger end substantially parallel to the axis of said rod part, for inserting therein respective fasteners to fasten said cap part and said rod part to each other, said fastening holes having respective central axes displaced off the centers of fractured surfaces of said larger end; and
   when said spreaders engage in said joint hole to crack said larger end, the area of contact between said second spreader on said movable stage and an inner wall surface of said joint hole is greater than the area of contact between said first spreader on said fixed stage and an inner wall surface of said joint hole.

2. An apparatus according to claim 1, wherein said first spreader on said fixed stage is disposed closely to said rod part, and said second spreader on said movable stage is disposed closely to said cap part.

* * * * *